(12) United States Patent
Sato et al.

(10) Patent No.: US 6,953,248 B2
(45) Date of Patent: Oct. 11, 2005

(54) PROGRESSIVE POWER LENS

(75) Inventors: Hiroshi Sato, Kanagawa-ken (JP);
Chikara Yamamoto, Saitama-ken (JP);
Moriyasu Shirayanagi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 87 days.

(21) Appl. No.: 10/685,389

(22) Filed: Oct. 16, 2003

(65) Prior Publication Data

US 2004/0109134 A1 Jun. 10, 2004

(30) Foreign Application Priority Data

Oct. 17, 2002 (JP) ........................................ 2002-303134

(51) Int. Cl.[7] ................................................ G02C 7/06
(52) U.S. Cl. ........................................................ 351/169
(58) Field of Search ........................................ 351/169

(56) References Cited

U.S. PATENT DOCUMENTS

| | | | |
|---|---|---|---|
| 5,708,429 A | | 1/1998 | Antoniol et al. ............... 341/65 |
| 5,708,492 A | * | 1/1998 | Kitani ........................ 351/169 |
| 5,710,615 A | * | 1/1998 | Kitani ........................ 351/169 |
| 6,412,948 B2 | | 7/2002 | Yanari ........................ 351/169 |
| 6,419,549 B2 | | 7/2002 | Shirayanagi ................... 451/5 |
| 2004/0189932 A1 | * | 9/2004 | Shinohara et al. ........... 351/164 |

FOREIGN PATENT DOCUMENTS

| | | |
|---|---|---|
| EP | 0772066 | 5/1997 |
| EP | 0872755 | 10/1998 |
| EP | 1158337 | 11/2001 |
| JP | 09-090291 | 4/1997 |
| JP | 11125580 | 5/1999 |
| JP | 2001-318344 | 11/2001 |
| JP | 2001-318345 | 11/2001 |
| JP | 2002-122824 | 4/2002 |

OTHER PUBLICATIONS

English Language Abstract of JP2002–122824.
English Language Abstract of JP09–090291.
English Language Abstract of JP2001–318345.

* cited by examiner

*Primary Examiner*—Georgia Epps
*Assistant Examiner*—Darryl J. Collins
(74) *Attorney, Agent, or Firm*—Greenblum & Bernstein, P.L.C.

(57) ABSTRACT

A progressive power lens belonging to a series of lenses according to the present invention is provided. If a first lens and a second lens randomly chosen from the series of progressive power lenses have a common spherical refractive power Sph [diopter] in the distance portions thereof, the Sph is greater than or equal to +1, and a base curve $BC_1$ of the first lens is smaller than a base curve $BC_2$ of the second lens, the first and second lenses satisfy a condition:

$$\frac{Wds(BC_1, Sph)}{Wns(BC_1, Sph)} \cdot \frac{Wdt(BC_1, Sph)}{Wnt(BC_1, Sph)} < \frac{Wds(BC_2, Sph)}{Wns(BC_2, Sph)} \cdot \frac{Wdt(BC_2, Sph)}{Wnt(BC_2, Sph)} \quad (1)$$

19 Claims, 14 Drawing Sheets

DISTRIBUTION OF
TRANSMISSION
ASTIGMATISM

DISTRIBUTION OF
AVERAGE TRANSMISSION
REFRACTIVE POWER

DISTRIBUTION OF
SURFACE
ASTIGMATISM

DISTRIBUTION OF
AVERAGE SURFACE
REFRACTIVE POWER

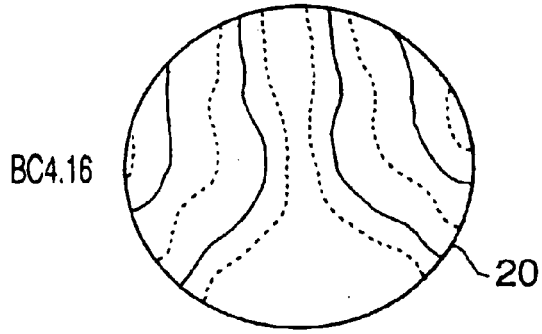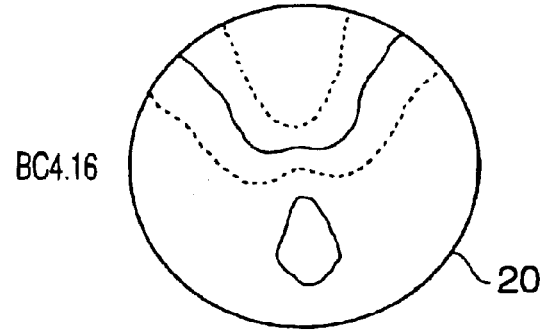
DISTRIBUTION OF TRANSMISSION ASTIGMATISM
FIG.13A
DISTRIBUTION OF AVERAGE TRANSMISSION REFRACTIVE POWER
FIG.13B
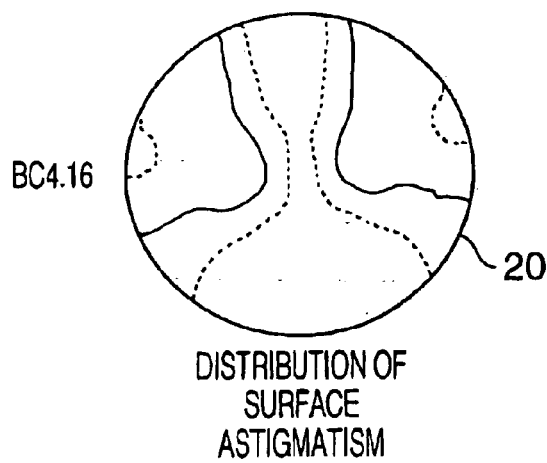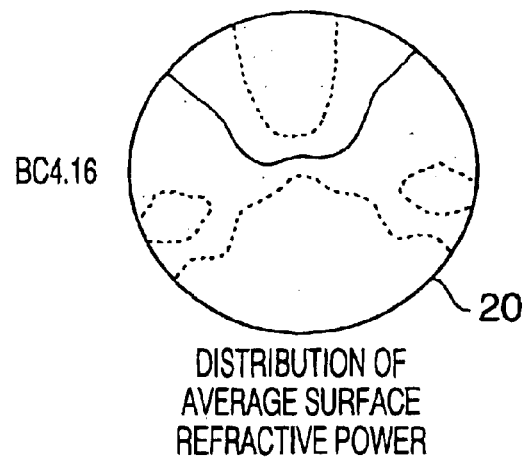
DISTRIBUTION OF SURFACE ASTIGMATISM
FIG.14A
DISTRIBUTION OF AVERAGE SURFACE REFRACTIVE POWER
FIG.14B

DISTRIBUTION OF
TRANSMISSION
ASTIGMATISM

DISTRIBUTION OF
AVERAGE TRANSMISSION
REFRACTIVE POWER

DISTRIBUTION OF
SURFACE
ASTIGMATISM

DISTRIBUTION OF
AVERAGE SURFACE
REFRACTIVE POWER

PROGRESSIVE POWER LENS

BACKGROUND OF THE INVENTION

The present invention relates to a progressive power lens used for correction of presbyopia.

The progressive power lenses for correction of presbyopia are developed and widely used. When the progressive power lens is designed and evaluated, the progressive power lens is often considered to have three portions: a distance portion for distance vision, a middle portion for middle vision and a near portion for near vision. Since refractive power within the middle portion changes continuously, the middle portion is referred to as a progressive area.

In general, clear definitions concerning object distances for the above three portions are not given. Therefore, in this specification, the term "distance portion" means a portion of a lens (i.e., a portion in a field of view of the lens) for viewing objects at relatively long distances, the term "near portion" means a portion of the lens for viewing objects at relatively short distances, and the term "middle portion" means a portion of the lens for viewing objects at middle distances between the relatively long distances and the relatively short distances.

In general, points on the lens for measuring vertex diopter within the distance portion and the near portion are referred to as a distance reference point and a near reference point, respectively. Although the distance reference point and the near reference point are often schematically illustrated as an area having a circular form or an elliptical form, in this specification, the distance reference point and the near reference point are considered as a center point of the circular area or the elliptical area.

Further, in this specification, a collection of points of intersection of a line of sight and a surface of the lens when a wearer (a person wearing spectacles) moves his/her eyes vertically is referred to as main meridian. The main meridian is a curved line passing through the distance reference point and the near reference point.

Since, in a case where objects at short distances are observed, a pupillary distance becomes shorter in comparison with a case where objects at long distances are observed, the progressive power lens is designed such that aberration distribution is bilaterally asymmetrical and the main meridian is shifted to a nose side from a center section through a lower area of the lens with respect to a reference line. The tern "reference lines" means a line extending in a vertical direction and passing through a center of the distance portion. In this specification, "upper", "lower", "horizontal", "vertical", and etc. represent directions with reference to a situation where the lens is wore by the wearer.

It is almost impossible to widen a clear vision area from the distance portion through the near portion. In this specification, the term "clear vision area" means an area through which the wearer can view objects without feeling distortion or blurring of an image. In many cases, the clear vision area is defined as an area in which transmission astigmatism is less than 0.5 or less than 1.0 [D: Diopter].

In general, a width of the clear vision area in the middle portion tends to be narrower in comparison with widths of the clear vision areas in the distance portion and the near portion. For this reason, the progressive power lenses are generally categorized into several groups depending on which portion of the lens has the maximum clear vision area.

A lens configured to have the largest possible clear vision areas both in the distance portion and the near portion and to have the middle portion with narrow clear vision area is referred to as a general-purpose progressive power lens. A progressive power lens for long/short distances belongs to the general-purpose progressive power lens.

With regard to the general-purpose progressive power lens, there is a problem that the wearer feels a so-called swinging of images due to distortion of an image which is caused by aberration in the middle portion and in particular in side areas within the middle portion when the wearer moves his/her line of sight relatively fast by shaking his/her head vertically or horizontally. The swinging of images causes uncomfortable feelings to the wearer. To solve this problem, it is required to keep astigmatism at a low level on the periphery of the middle portion.

For this reason, a progressive power lens for middle/short distances having larger clear vision area in the middle portion than that of the general-purpose progressive power lens has been proposed. The progressive power lens for middle/short distances is configured such that a rate of change in refractive power in a vertical direction within the middle portion is kept low by enlarging upward the size of the progressive area (i.e., the middle portion). Consequently, aberration in the side areas of the middle portion is reduced. Also, the progressive power lens for middle/short distances is configured to make the width of the clear vision area in the middle portion wider.

Although the above design of the progressive power lens for middle/short distances sacrifices a size of the clear vision area in the distance portion, the swinging of images can be suppressed and therefore the progressive power lens exhibits outstanding performance for indoor use in which the progressive power lens is mainly used for middle vision and near vision.

A progressive power lens for short distance has also been proposed. The progressive power lens for short distance is designed such that the clear vision area in a lower side within the middle portion and in the near portion becomes wider by narrowing the clear vision area in the distance portion and in an upper area within the middle portion. With this configuration, outstanding optical performance for work where the wearer is required to view objects at short distances is attained. It should be noted that, in the case of the progressive lens for short distance, the distance portion of the lens is a portion through which objects at relatively long distance (i.e., at distance of 1 through 2 meter) are viewed.

Points of interest of conventional lens design and evaluation of the progressive power lens were optical performance concerning a progressive power surface (hereafter, referred to as surface performance). That is, a dioptric power error and astigmatism each of which indicates the optical performance of a lens surface are calculated according to a difference between maximum principal curvature and minimum principal curvature of the progressive power surface and average values of the maximum principal curvature and the minimum principal curvature.

In addition, categorization of progressive power lenses (i.e., to categorize progressive power lenses as the lens for long/short distances, the lens for middle/short distances or the lens for short distance) was made according to aberration distribution of a lens surface.

However, optical performance of a spectacle lens should be evaluated by analyzing light beams passing through various points on the spectacle lens because the wearer feels the spectacle lens suitable if the optical performance evaluated by the light beams passing through the points on the spectacle lens is excellent. In this specification, the optical performance evaluated based on the light beams passing through the points on the spectacle lens is referred to as transmission performance.

It should be noted that the transmission performance differs from the surface performance and the difference between the transmission performance and the surface performance becomes greater particularly within peripheral regions of the lens. In Japanese Provisional Publication No. HEI11-125580 previously filed by the assignee of the present invention, the transmission performance and the evaluation method thereof are discussed in detail.

Meanwhile, the spectacle lens is required to have aesthetic appearance in a condition where the spectacles are worn by the wearer. In general, a thin spectacle lens is desired in terms of aesthetics and manufacturability. Further, since the spectacles are consists of a pair of lenses and a spectacle frame, the aesthetic appearance of the spectacle lens should be evaluated considering a balance between right and left lenses.

In this point of view, front surfaces (object side surfaces) of the right lens and the left lens are equal to each other and rear surfaces (eye side surfaces) of the right lens and the left lens are equal to each other when refractive power required of the right and left lenses are the same.

On the contrary, when a difference between the refractive power required of the right lens and the left lens is relatively great, if the right and left lenses are individually designed, forms of the light and left lens becomes different from each other. In this case, the balance between the right and left lenses is lost and therefore aesthetic appearance of the spectacles is damaged. Therefore, to provide spectacles having aesthetic appearance, it is preferable that outer surfaces of the right and left lenses are equal to each other.

However, if the right and left lenses are designed considering only forms of the lenses so that base curves of the right and left lenses are matched with each other, aberration increases because in general a form of the lens which minimizes aberration with reference to required refractive power is limited. Consequently, optical performance deteriorates. Therefore, it is required to design spectacle lens considering a balance between a form of the lens and optical performance of the lens. Thus, conventionally, only a single kind of lens having a certain base curve with reference to a certain refractive power has been designed.

At this point of view, three kind of progressive power lenses and a manufacturing method are proposed in Japanese Provisional Publications No. HEI9-90291 (document 1), 2001-318344 (document 2), 2001-318345 (document 3) and 2002-122824 (document 4).

The progressive power lens disclosed in the document 1 is designed by cut-and-try methods to achieve suitable transmission performance. Although in the document 1 some guidelines about a lens design to improve distribution of dioptric power are explained, guidelines concerning a lens design for improving astigmatism which has a great effect on optical performance of the lens are not discussed at all. From a distribution map of transmission astigmatism indicated in the document 1, it is understood that a sufficiently wide clear vision area is not achieved.

Each of progressive power lenses disclosed in the documents 2 and 3 belongs to a certain progressive power lens family which is designed to have constant optical performance even if a base curve of the lens changes according to spherical refractive power required by the wearer.

Although the progressive power lens in each of the documents 2 and 3 is designed to primarily achieve an improvement in optical performance within the distance portion and uniformity of a series of progressive power lenses, concrete suggestion with regard to a lens design for improving distribution of astigmatism of the whole lens is not discussed at all. In addition, in the documents 2 and 3, to match a base curve of a left lens to that of a right lens so as to improve aesthetic appearance of the spectacles is not discussed at all.

A manufacturing method disclosed in the document 4 achieves a progressive power lens having a certain spherical refractive power within the distance portion for a plurality of kinds of base curves. Further, according to the manufacturing method of document 4, deterioration of optical performance of each lens can be reduced to a minimum when an identical base curve is adopted by right and left lenses having different dioptric power. However, the optimization of optical performance of the lens discussed in the document 4 only relates to reducing aberration of each lens. To equate distribution of transmission aberrations of a plurality of lenses having different base curves is not discussed in the document 4 at all.

Advantages of achieving uniform distribution of transmission aberrations for lenses having different base curves and/or different spherical refractive power within the distance portions are as follows.

One of the advantages is that the wearer can have natural view without having different visions through right and left lenses even if base curves of the right and left lenses are designed to be equal to each other to keep an appearance of the lens excellent in a condition where dioptric power in the right lens and the left lens are different from each other.

Further, if the distribution of transmission aberration can be kept substantially constant among the lenses having different spherical dioptric power, to equate base curves of the lenses can be attained within wide range of the lenses. Consequently, the range of choices of the lenses for the wearer may be extended. However, a progressive power lens family having a uniform aberration balance for different base curves and for different spherical dioptric power has not been provided.

SUMMARY OF THE INVENTION

The present invention is advantageous in that it provides a spectacle lens which is configured to have substantially wide vision while transmission astigmatism of the lens is reduced sufficiently.

According to an aspect of the present invention, there is provided a progressive power lens belonging to a series of progressive power lenses which is designed such that lenses belonging to the series of progressive power lenses have substantially the same basic specification and the lenses belonging to the series of progressive power lenses have different base curves, the progressive power lens having a front surface and a rear surface. Further, at least one of the front and rear surfaces includes: a distance portion having refractive power for distance vision; a near portion having refractive power for near vision; and a middle portion in which refractive power continuously changes to connect the refractive power of the distance portion and the refractive power of the near portion. In this configuration, if a first lens and a second lens randomly chosen from the series of progressive power lenses have a common spherical refractive power Sph [diopter] at distance reference points thereof, and a base curve $BC_1$ of the first lens is smaller than a base curve $BC_2$ of the second lens, the first and second lenses satisfy conditions (1) and (2):

$$\frac{\frac{Wds(BC_1, Sph)}{Wns(BC_1, Sph)}}{\frac{Wdt(BC_1, Sph)}{Wnt(BC_1, Sph)}} < \frac{\frac{Wds(BC_2, Sph)}{Wns(BC_2, Sph)}}{\frac{Wdt(BC_2, Sph)}{Wnt(BC_2, Sph)}} \quad (1)$$

$$\frac{\frac{Wds(BC_1, Sph)}{Wns(BC_1, Sph)}}{\frac{Wdt(BC_1, Sph)}{Wnt(BC_1, Sph)}} > \frac{\frac{Wds(BC_2, Sph)}{Wns(BC_2, Sph)}}{\frac{Wdt(BC_2, Sph)}{Wnt(BC_2, Sph)}} \quad (2)$$

where the condition (1) holds when the Sph is greater than or equal to +1, and the condition (2) holds when the Sph is smaller than or equal to −1. In the above conditions, Wdt represents a width of an area in which transmission astigmatism is less than or equal to one-half of additional dioptric power AD [diopter] which is defined as a difference of the refractive power at a distance reference point and the refractive power at a near reference point, Wdt being measured in a horizontal direction at a point in the distance portion shifted upward in a vertical direction by a certain distance from a geometrical origin of the progressive power lens, Wnt represents a width of an area in which transmission astigmatism is less than or equal to one-half of the AD, Wnt being measured in the horizontal direction at a point in the near portion shifted downward in the vertical direction by a certain distance from the geometrical origin, Wds represents a width of an area in which surface astigmatism is less than or equal to one-half of the AD, Wds being measured in the horizontal direction at a point in the distance portion shifted upward in the vertical direction by a certain distance from the geometrical origin, Wns represents a width of an area in which surface astigmatism is less than or equal to one-half of the AD, Wns being measured in the horizontal direction at a point in the near portion shifted downward in the vertical direction by a certain distance from the geometrical origin.

By designing the progressive power lens to satisfy relationship (i.e., conditions (1) and (2)) among the surface astigmatism and the transmission astigmatism within the distance portion and the near portion, transmission astigmatism can be kept at low level and the clear vision area (i.e., an actual vision of the wearer) can be kept wide. To keep excellent aesthetic appearance, a plurality of base curves are provided with respect to a certain dioptric power of the distance portion. Further, a series of progressive power lenses having a unified aberration balance in transmission performance can be provided.

According to the progressive power lens belonging to the series of progressive power lenses, by equating aberration balances of a right lens and a left lens, spectacles whose vision through the left lens and vision through the right lens are substantially equal to each other can be provided. In each of the documents (1)–(4), quantitative conditions about relationship between surface astigmatism and transmission astigmatism are not discussed at all. Therefore, it is impossible to accomplish the series of progressive power lenses having the unified aberration balance based on the documents (1)–(4).

The basic specification includes, for example, the spherical refractive power for the distance portion Sph [unit: D (diopter)], the additional refractive power AD [unit: D], and the length of the progressive area [unit: mm].

Optionally, when the Sph is greater than or equal to +1, the first and second lenses may satisfy a condition:

$$\frac{\frac{Wds(BC_1, Sph)}{Wns(BC_1, Sph)}}{\frac{Wdt(BC_1, Sph)}{Wnt(BC_1, Sph)}} < \frac{\frac{Wds(BC_2, Sph)}{Wns(BC_2, Sph)}}{\frac{Wdt(BC_2, Sph)}{Wnt(BC_2, Sph)}} < 1. \quad (3)$$

Optionally, when the Sph is smaller than or equal to −1, the first and second lenses may satisfy a condition:

$$\frac{\frac{Wds(BC_1, Sph)}{Wns(BC_1, Sph)}}{\frac{Wdt(BC_1, Sph)}{Wnt(BC_1, Sph)}} > \frac{\frac{Wds(BC_2, Sph)}{Wns(BC_2, Sph)}}{\frac{Wdt(BC_2, Sph)}{Wnt(BC_2, Sph)}} > 1. \quad (4)$$

The progressive power lens satisfying the condition (3) or (4) has a suitable optical performance as a progressive power lens for middle/short distances.

According to another aspect of the present invention, there is provided a progressive power lens belonging to a series of progressive power lenses which is designed such that lenses belonging to the series of progressive power lenses have substantially the same basic specification and the lenses belonging to the series of progressive power lenses have different base curves, the progressive power lens having a front surface and a rear surface. Further, at least one of the front and rear surfaces includes a distance portion having refractive power for distance vision, a near portion having refractive power for near vision, and a middle portion in which refractive power continuously changes to connect the r fractive power of the distance portion and the refractive power of the near portion. In this configuration, if a first lens and a second lens randomly chosen from the series of progressive power lenses have a common spherical refractive power Sph [diopter] at distance reference points thereof, and a base curve $BC_1$ of the first lens is smaller than a base curve $BC_2$ of the second lens, the first and second lenses satisfy conditions (5) and (6):

$$\frac{Wds(BC_1, Sph)}{Wns(BC_1, Sph)} < \frac{Wds(BC_2, Sph)}{Wns(BC_2, Sph)} < 1 \quad (5)$$

$$\frac{Wds(BC_1, Sph)}{Wns(BC_1, Sph)} > \frac{Wds(BC_2, Sph)}{Wns(BC_2, Sph)} > 1 \quad (6)$$

where the condition (5) holds when the Sph is greater than or equal to +1, and the condition (6) holds when the Sph is smaller than or equal to −1.

By thus determining the placement of the surface astigmatism in the distance portion and in the near portion, transmission astigmatism can be kept at low level and the clear vision area can be kept wide. To keep excellent aesthetic appearance, a plurality of base curves are provided with respect to a certain dioptric power of the distance portion. Further, a series of progressive power lenses having a unified aberration balance in transmission performance can be provided.

According to another aspect of the present invention, there is provided a progressive power lens belonging to a series of progressive power lenses which is designed such that lenses belonging to the series of progressive power lenses have substantially the same basic specification and the lenses belonging to the series of progressive power lenses have different base curves, the progressive power lens having a front surface and a rear surface. Further, at least one of the front and rear surfaces includes a distance portion having refractive power for distance vision, a near portion having refractive power for near vision, and a middle portion in which refractive power continuously changes to connect the refractive power of the distance portion and the refractive power of the near portion. In this configuration, a first lens and a second lens randomly chosen from the series of progressive power lenses satisfy a condition if $BC_1 \neq BC_2$ or $Sph_1 \neq Sph_2$:

$$\left| \frac{Wdt(BC_1, Sph_1)}{Wnt(BC_1, Sph_1)} - \frac{Wdt(BC_2, Sph_2)}{Wnt(BC_2, Sph_2)} \right| \leq 1 \qquad (7)$$

where $BC_1$ and $BC_2$ respectively represent base curves of the first and second lenses, $Sph_1$ and $Sph_2$ respectively represent spherical refractive power of the first and the second lenses at distance reference points thereof.

By thus determining distribution of transmission astigmatism in the distance portion and the near portion, transmission astigmatism can be kept at low level and the clear vision area can be kept wide. Further, a series of progressive power lenses having a unified aberration balance in transmission performance can be provided even if the base curve is changed to keep a good appearance of the lens and/or even if the spherical refractive power for the distance portion is changed in accordance with the lens specification.

Optionally, the first and second lenses may satisfy a condition:

$$\left| \frac{Wdt(BC_1, Sph_f)}{Wnt(BC_1, Sph_f)} - \frac{Wdt(BC_2, Sph_f)}{Wnt(BC_2, Sph_f)} \right| \leq 1 \qquad (8)$$

where $BC_1 \neq BC_2$, and both of $Sph_1$ and $Sph_2$ take a certain value $Sph_f$ ($Sph_1 = Sph_2 = Sph_f$).

Still optionally, if the $Sph_f$ is less than 0, the first and second lenses may satisfy a condition:

$$\left| \frac{Wdt(BC_1, Sph_f)}{Wnt(BC_1, Sph_f)} - \frac{Wdt(BC_2, Sph_f)}{Wnt(BC_2, Sph_f)} \right| \leq 0.5. \qquad (9)$$

Optionally, when the condition (7) is satisfied, if both of $BC_1$ and $BC_2$ take a certain value $BC_f$ ($BC_1 = BC_2 = BC_f$) and $Sph_1 \neq Sph_2$, the first and second lenses may satisfy a condition:

$$\left| \frac{Wdt(BC_f, Sph_1)}{Wnt(BC_f, Sph_1)} - \frac{Wdt(BC_f, Sph_2)}{Wnt(BC_f, Sph_2)} \right| \leq 1. \qquad (10)$$

With regard to the above mentioned progressive power lens satisfying one of the conditions (1)–(10), it is preferable that a length of the middle portion in a vertical direction is greater than or equal to 15 mm and less than or equal to 30 mm.

By making the length of the middle portion (i.e., the progressive area) more than or equal to 15 mm, the clear vision area in the middle portion can be kept wide, and occurrence of astigmatism in side areas of the middle portion (i.e., in a left area and a right area of the lens) can be suppressed. Further, by making the length of the progressive area less than or equal to 30 mm, angle of rotating movement of eyes can be kept small when the line of sight is changed from a distant position to a near position and therefore the burden on the wearer's eyes can be reduced. Consequently, the progressive power lens which produces little swinging and distortion of images and which does not produce tiredness of eyes can be provided.

In a particular case, the distance portion, the near portion and the middle portion (i.e., a progressive power surface) may be formed on the rear surface. The rear surface is an eye side surface of the lens. Since the progressive surface is formed on the rear surface, only spherical surface processing is required to form the front surface. In this case, it is not required to prepare a plurality of kinds of molds for the front surface with respect to a plurality of kinds of additional refractive power and/or the length of the progressive area. Consequently, manufacturing cost of the progressive power lens is reduced considerably.

In a particular case, each of the points at which Wdt and Wds are measured may substantially coincide with a distance reference point, and each of the points at which Wnt and Wns are measured may substantially coincide with a near reference point.

In a particular case, each of the certain distances at which Wdt, Wnt, Wds and Wns are measured may be 15 mm.

According to another aspect of the present invention, there is provided a progressive power lens for middle/short distances having a front surface and a rear surface, at least one of the front and rear surfaces including a distance portion having refractive power for distance vision, a near portion having refractive power for near vision, and a middle portion in which refractive power continuously changes to connect the refractive power of the distance portion and the refractive power of the near portion. In this configuration, the progressive power lens satisfies a condition:

$$0.8 < \frac{Wdt}{Wnt} < 2.0. \qquad (11)$$

By thus determining distribution of transmission astigmatism in the distance portion and the near portion, transmission astigmatism can be kept at low level and the clear vision area can be kept wide. Consequently, a progressive power lens for middle/short distances which enables the wearer to obtain an excellent wearing comfort particularly in office work is accomplished.

According to another aspect of the present invention, there is provided a progressive power lens for short distance having a front surface and a rear surface, at least one of the front and rear surfaces including a distance portion having refractive power for distance vision, a near portion having refractive power for near vision, and a middle portion in which refractive power continuously changes to connect the refractive power of the distance portion and the refractive power of the near portion. In this configuration, the progressive power lens satisfied a condition:

$$0.2 < \frac{Wdt}{Wnt} < 1.0. \qquad (12)$$

With this configuration, a progressive power lens for middle/short distances and a progressive power lens for short distance specifically targeted for the near vision can be accomplished.

With regard to the progressive power lens satisfying the condition (11) or (12), it is preferable that a length of the middle portion in a vertical direction is greater than or equal to 15 mm and less than or equal to 30 mm. By making the length of the middle portion (i.e., the progressive area) more than or equal to 15 mm, the clear vision area in the middle portion can be kept wide, and occurrence of astigmatism in side areas of the middle portion (i.e., in a left area and a right area of the lens) can be suppressed. Further, by making the length of the progressive area less than or equal to 30 mm, angle of rotating movement of eyes can be kept small when the line of sight is changed from a distant position to a near position and therefore the burden on the wearer's eyes can be reduced. Consequently, the progressive power lens which produces little swinging and distortion of images and which does not produce tiredness of eyes can be provided.

In a particular case, the distance portion, the near portion and the middle portion may be formed on the rear surface.

In a particular case, each of the certain distances at which Wdt and Wnt are measured may be 15 mm.

BRIEF DESCRIPTION OF THE ACCOMPANYING DRAWINGS

FIG. 13A shows distribution of transmission astigmatism of a progressive power lens according to a second embodiment of the invention;

FIG. 13B shows distribution of average transmission refractive power of the progressive power lens;

FIG. 14A shows distribution of surface astigmatism of the progressive power lens;

FIG. 14B shows distribution of average surface refractive power of the progressive power lens 20;

DETAILED DESCRIPTION OF THE EMBODIMENTS

Hereinafter, embodiments according to the invention are described with reference to the accompanying drawings.

First Embodiment

Figure 1A:
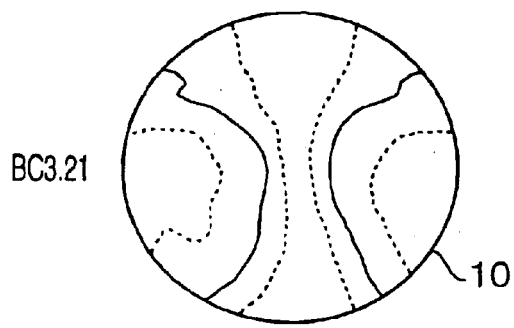
FIG. 1A shows distribution of transmission astigmatism of a progressive power lens according to a firt embodiment of the present invention.
Figure 1B:
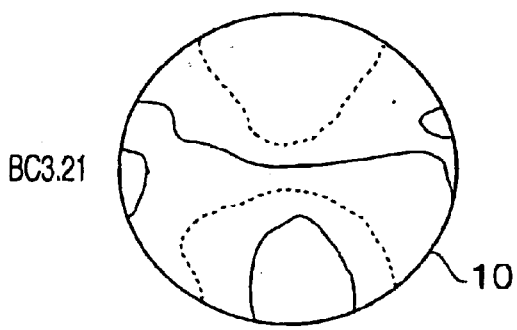
FIG. 1B shows distribution of average transmission refractive power of the progressive power lens.

FIGS. 1A and 1B show transmission performance of a progressive power lens 10 according to a first embodiment of the invention. FIG. 1A shows distribution of transmission astigmatism of the progressive power lens 10. FIG. 1B shows distribution of average transmission refractive power of the progressive power lens 10. In each of FIGS. 1A and 1B (and in each of the following distribution maps), an interval between adjacent contour lines corresponds to 0.5 (unit: D). The progressive spectacle lens 10 has a diameter of 60 mm.

Figure 2A:
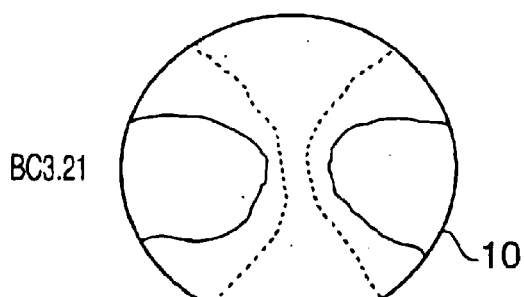
FIG. 2A shows distribution of surface astigmatism of the progressive power lens.
Figure 2B:
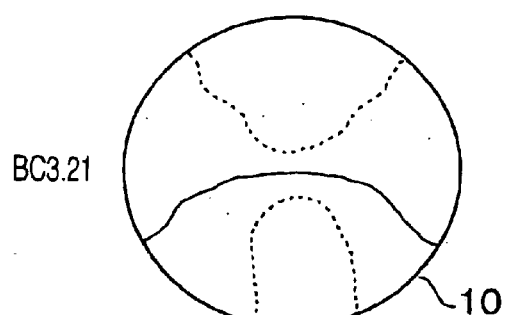
FIG. 2B shows distribution of average surface refractive power of the progressive power lens.

FIGS. 2A and 2B show surface performance of the progressive power lens 10. FIGS. 2A and 2B respectively show distribution of surface astigmatism and distribution of average surface refractive power of the progressive power lens 10.

The transmission performance shown in FIGS. 1A and 1B is a target optical performance of a series of progressive power lenses according to the first embodiment of the invention. The series of progressive power lenses is designed to attain the transmission performance shown in FIGS. 1A and 1B.

The progressive power lens 10, a so-called progressive power lens for middle/short distances, has spherical refractive power for the distance portion Sph of 0.0 [D:Diopter], additional dioptric power AD of 2.0 [D], and a base curve BC of 3.21 [D]. A progressive area of the lens 10 starts at a point shifted upward by 11 mm from a geometrical origin point O, extends downward, and ends at a point shifted downward by 8 mm from the origin point. That is, the length of the progressive area (i.e., a vertical size of a middle portion) is 19 mm.

Figure 3:
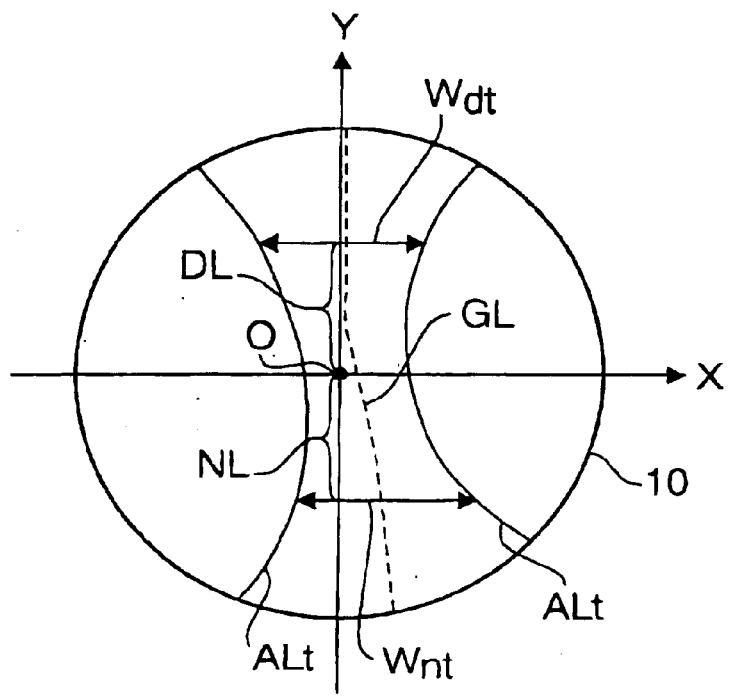
FIG. 3 illustrates various types of physical quantities which characterize the transmission performance of the progressive power lens.
Figure 4:
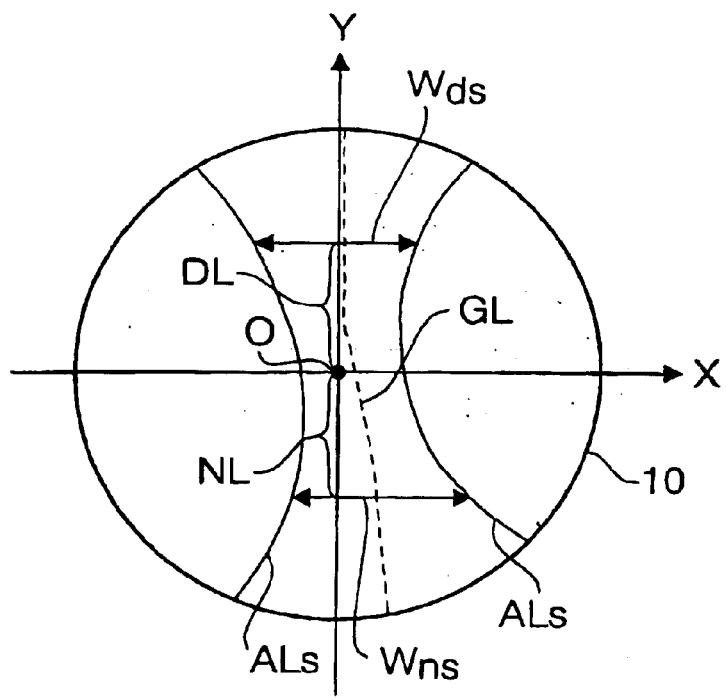
FIG. 4 illustrates various types of physical quantities which characterize surface performance of the progressive power lens.

FIG. 3 illustrates various types of physical quantities which characterize the transmission performance of a progressive power lens according to embodiments of the invention. FIG. 4 illustrates various types of physical quantities which characterize surface performance of a progressive power lens according to embodiments of the invention.

In each of FIGS. 3 and 4, an axis X and an axis Y pass through the origin point O and are perpendicular to each other. A direction of the axis X substantially coincides with a horizontal direction, and a direction of the axis Y substantially coincides with a vertical direction. As shown in FIGS.

3 and 4, main meridian GL is shifted to a nose side within the middle portion and a near portion.

In FIG. 3, two curved lines ALt and ALt are contour lines each of which indicates the transmission astigmatism having a value of one-half of the additional dioptric power. Wdt (unit:mm) represents a width between the lines ALt and ALt at a position shifted upward in the vertical direction by DL (unit:mm) from the axis X. Wnt (unit:mm) represents a width between the lines ALt and ALt at a position shifted downward in the vertical direction by NL (unit:mm) from the axis X. Hereafter, an area between the two lines ALt and ALt is defined as a clear vision area.

In FIG. 4, two curved lines ALs and ALs are contour lines each of which indicates the surface astigmatism having a value of one-half of the additional dioptric power. Wds (unit:mm) represents a width between the lines ALs and ALs at a position shifted upward along the axis Y by DL (unit:mm) from the origin point O. Wns (unit:mm) represents a width between the lines ALt and ALt at a position shifted downward along the axis Y by NL (unit:mm) from the origin point O.

DL is substantially equal to a distance from the axis X to a measurement point at which dioptric power of the distance portion is measured. NL is substantially equal to a distance from the axis X to a measurement point at which dioptric power of the near portion is measured. In this embodiment, Wdt and Wds represent widths in the horizontal direction between the lines ALt and ALt and the lines ALs and ALs within the distance portion, respectively. Also, Wnt and Wns represent widths in the horizontal direction between the lines ALt and ALt and the lines ALs and ALs within the near portion, respectively.

If DL and NL are set to 15 mm, respectively, the following features about the widths (Wdt, Wnt, Wds and Wns) are derived in regard to distribution of transmission astigmatism and distribution of surface astigmatism.

In order to explain the feature of the series of the lenses designed in accordance with the optical performance of the progressive power lens 10, two lenses (a first lens and a second lens) are chosen from the series of the lenses on a random basis. Then, relation between a ratio of Wdt to Wnt and a ratio of Wds to Wns is checked.

In a case where the first and second lenses randomly selected from the series of the lenses have a certain spherical refractive power for the distance portion Sph and the base curve of each of the first and second lenses varies, the first and the second lenses satisfy the following conditions (1) and (2). The condition (1) holds while the spherical refractive power for the distance portion Sph is greater than or equal to +1. The condition (2) holds while the spherical refractive power for the distance portion Sph is less than or equal to −1.

$$\frac{\frac{Wds(BC_1, Sph)}{Wns(BC_1, Sph)}}{\frac{Wdt(BC_1, Sph)}{Wnt(BC_1, Sph)}} < \frac{\frac{Wds(BC_2, Sph)}{Wns(BC_2, Sph)}}{\frac{Wdt(BC_2, Sph)}{Wnt(BC_2, Sph)}} \quad (1)$$

$$\frac{\frac{Wds(BC_1, Sph)}{Wns(BC_1, Sph)}}{\frac{Wdt(BC_1, Sph)}{Wnt(BC_1, Sph)}} > \frac{\frac{Wds(BC_2, Sph)}{Wns(BC_2, Sph)}}{\frac{Wdt(BC_2, Sph)}{Wnt(BC_2, Sph)}} \quad (2)$$

In the above conditions (and in the following conditions), $BC_1$ and $BC_2$ represent base curves of the first and second lenses, respectively. In addition, in the above conditions (1) and (2), $BC_2$ is greater than $BC_1$ ($BC_1 < BC_2$).

If relatively thin lenses are selected as the first and second lenses, the first and second lenses satisfy the following conditions (3) and (4). The condition (3) holds while the spherical refractive power for the distance portion Sph is greater than or equal to +1. The condition (4) holds while the spherical refractive power for the distance portion Sph is less than or equal to −1.

$$\frac{\frac{Wds(BC_1, Sph)}{Wns(BC_1, Sph)}}{\frac{Wdt(BC_1, Sph)}{Wnt(BC_1, Sph)}} < \frac{\frac{Wds(BC_2, Sph)}{Wns(BC_2, Sph)}}{\frac{Wdt(BC_2, Sph)}{Wnt(BC_2, Sph)}} < 1 \quad (3)$$

$$\frac{\frac{Wds(BC_1, Sph)}{Wns(BC_1, Sph)}}{\frac{Wdt(BC_1, Sph)}{Wnt(BC_1, Sph)}} > \frac{\frac{Wds(BC_2, Sph)}{Wns(BC_2, Sph)}}{\frac{Wdt(BC_2, Sph)}{Wnt(BC_2, Sph)}} > 1 \quad (4)$$

Next, the surface performance of the series of lenses of the first embodiment will be considered. In a case where the first and second lenses randomly selected from the series of lenses have a certain spherical refractive power for the distance portion Sph and the base curve of each of the first and second lenses varies, the first and the second lenses satisfy the following conditions (5) and (6). The condition (5) holds while the spherical refractive power for the distance portion Sph is greater than or equal to +1. The condition (6) holds while the spherical refractive power for the distance portion Sph is less than or equal to −1.

$$\frac{Wds(BC_1, Sph)}{Wns(BC_1, Sph)} < \frac{Wds(BC_2, Sph)}{Wns(BC_2, Sph)} < 1 \quad (5)$$

$$\frac{Wds(BC_1, Sph)}{Wns(BC_1, Sph)} > \frac{Wds(BC_2, Sph)}{Wns(BC_2, Sph)} > 1 \quad (6)$$

In the above conditions (5) and (6), $BC_1$ is smaller than $BC_2$ ($BC_1 < BC_2$).

By designing the series of lenses so that the first and second lenses randomly selected from the series of lenses satisfy the conditions (5) and (6), transmission performance is enhanced without deterioration of the aesthetic appearance of the lens and spectacle lenses having a unified aberration balance can be attained.

Next, the transmission performance of the first and second lenses randomly selected from the series of lenses of the first embodiment will be considered. In a case where at least one of the spherical refractive power for the distance portion and the base curve of each of the first and second lenses varies, the first and second lenses satisfy the following condition (7).

$$\left| \frac{Wdt(BC_1, Sph_1)}{Wnt(BC_1, Sph_1)} - \frac{Wdt(BC_2, Sph_2)}{Wnt(BC_2, Sph_2)} \right| \leq 1 \quad (7)$$

In a case where the first and second lenses have a certain spherical refractive power for the distance portion $Sph_f$ and the base curve of each of the first and second lenses varies, the first and second lenses satisfy the following condition (8).

$$\left| \frac{Wdt(BC_1, Sph_f)}{Wnt(BC_1, Sph_f)} - \frac{Wdt(BC_2, Sph_f)}{Wnt(BC_2, Sph_f)} \right| \leq 1 \quad (8)$$

When the first and second lenses satisfy the condition (8), if $Sph_f$ has a minus value, the first and second lenses further satisfy the following condition (9).

$$\left|\frac{Wdt(BC_1, Sph_f)}{Wnt(BC_1, Sph_f)} - \frac{Wdt(BC_2, Sph_f)}{Wnt(BC_2, Sph_f)}\right| \leq 0.5 \quad (9)$$

In a case where the first and second lenses randomly selected from the series of lenses have a certain base curve $BC_f$ and the spherical refractive power for the distance portion of each of the first and second lenses varies, the first and second lenses satisfy the following condition (10).

$$\left|\frac{Wdt(BC_f, Sph_1)}{Wnt(BC_f, Sph_1)} - \frac{Wdt(BC_f, Sph_2)}{Wnt(BC_f, Sph_2)}\right| \leq 1 \quad (10)$$

The width of the clear vision area can be adjusted in accordance with a specification of the spectacle lens by designing the series of lenses of the first embodiment to satisfy one of the above conditions (8)–(10). Consequently, excellent optical performance in a condition where the spectacles lens is worn is attained, and the lens having excellent aesthetic appearance is attained.

The feature about a single progressive power lens according to the embodiment will be considered. A progressive power lens which belongs to the series of lenses of the first embodiment satisfies a condition (11).

$$0.8 < \frac{Wdt}{Wnt} < 2.0 \quad (11)$$

The progressive power lens whose widths of the clear vision areas in the distance portion and in the near portion satisfy the condition (11) is a progressive power lens for middle/short distances having excellent transmission performance. The wearer who wears such a progressive power lens for middle/short distances can obtain an excellent wearing comfort particularly in office work.

Figure 5:
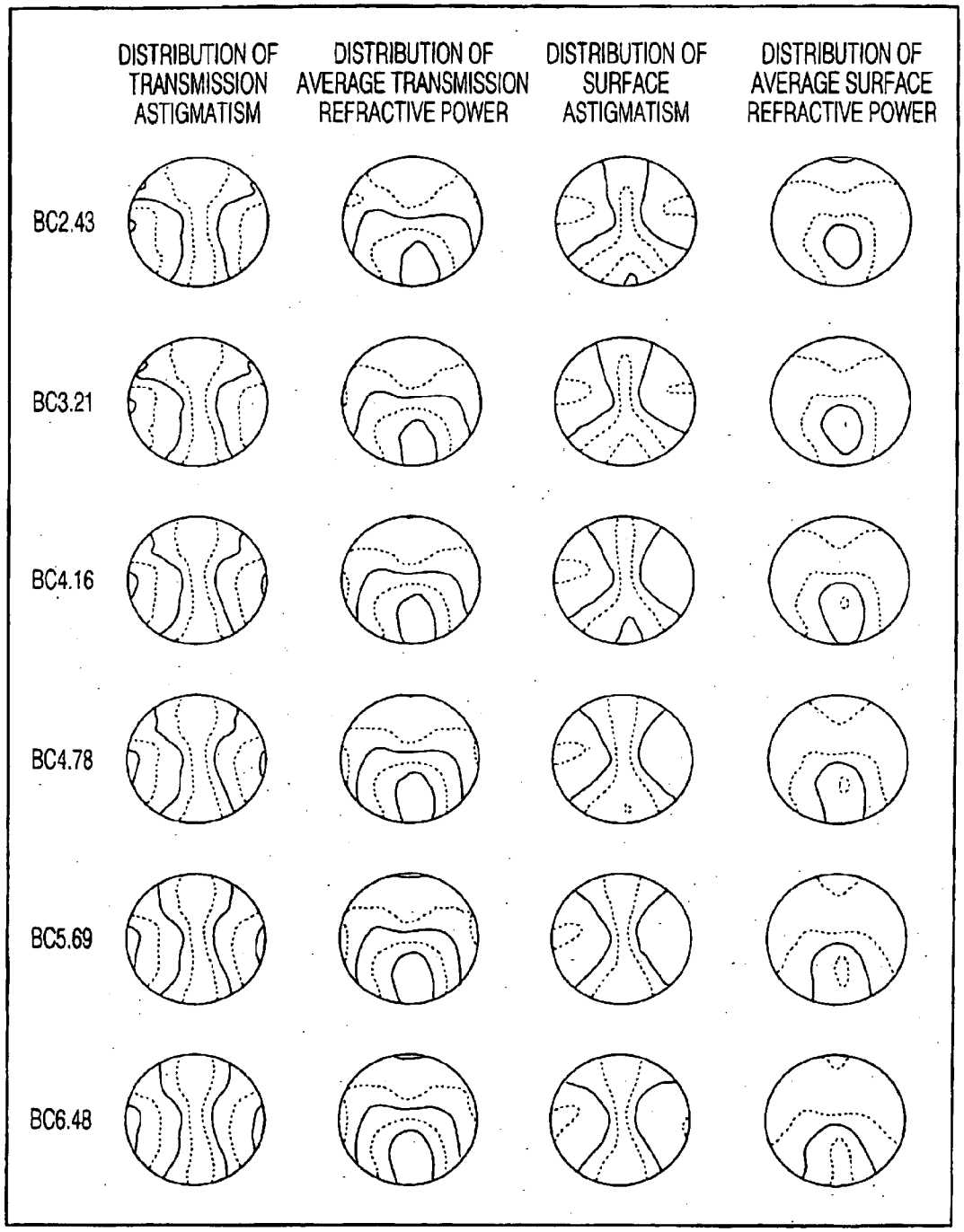
FIG. 5 shows transmission performance and surface performance of several lenses of a series of lenses according to the first embodiment.

FIG. 5 shows transmission performance and surface performance of several lenses of the series of lenses according to the first embodiment. More specifically, in FIG. 5, distribution of transmission astigmatism, distribution of average transmission refractive power, distribution of surface astigmatism and distribution of average surface refractive power are indicated for each of the several lenses. Each of the lenses shown in FIG. 5 has a common spherical refractive power Sph of +2.00 [D], and additional dioptric power of 2.0 [D]. The base curves of the lenses listed in FIG. 5 vertically in order of increasing base curve are 2.43, 3.21, 4.16, 4.78, 5.69 and 6.48 [D], respectively.

Figure 6:
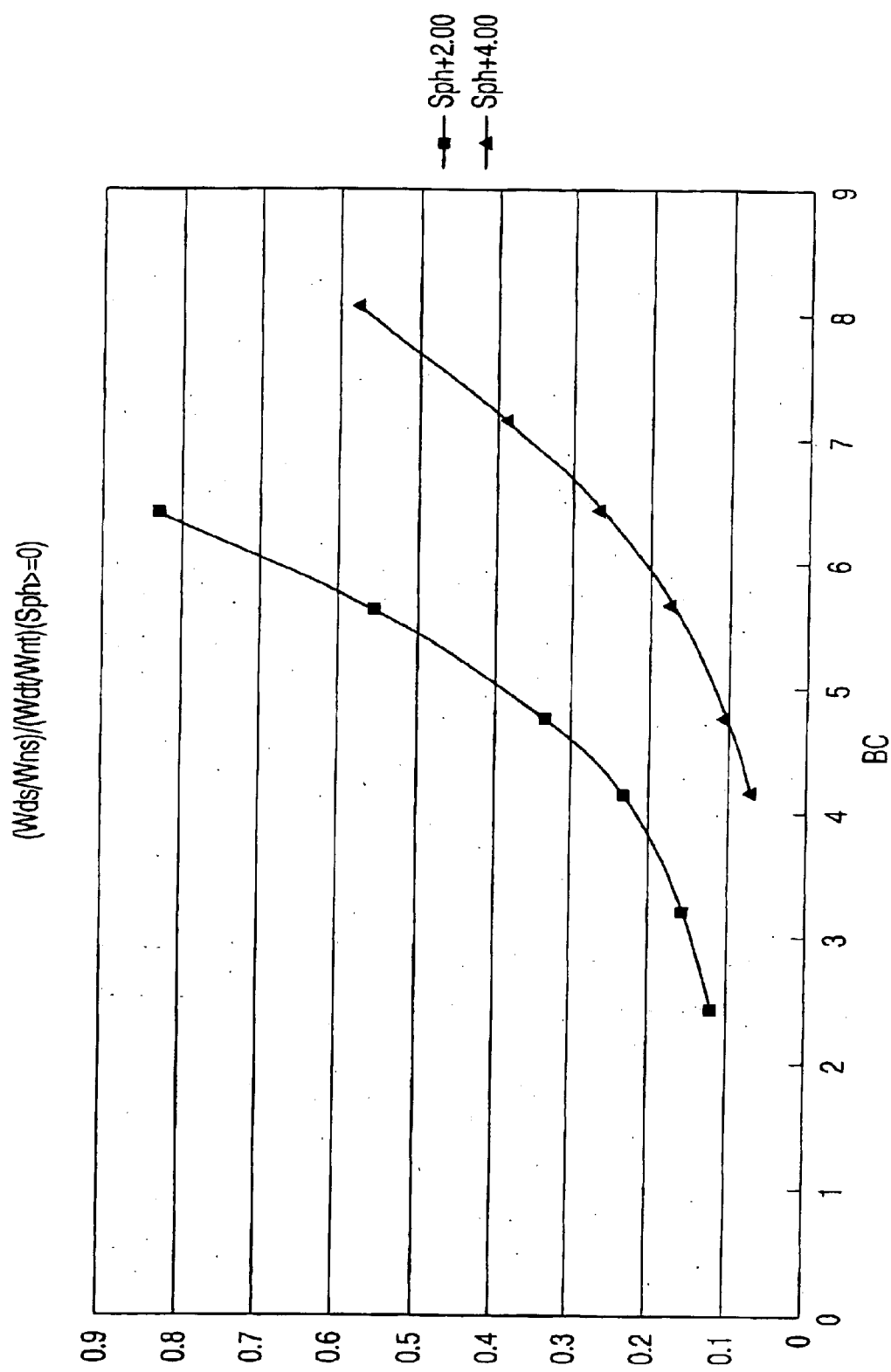
FIG. 6 is a graph illustrating variation of (Wds/Wns)/(Wdt/Wnt) with respect to variation of a base curve when spherical refractive power for the distance portion Sph has a plus value.
Figure 7:
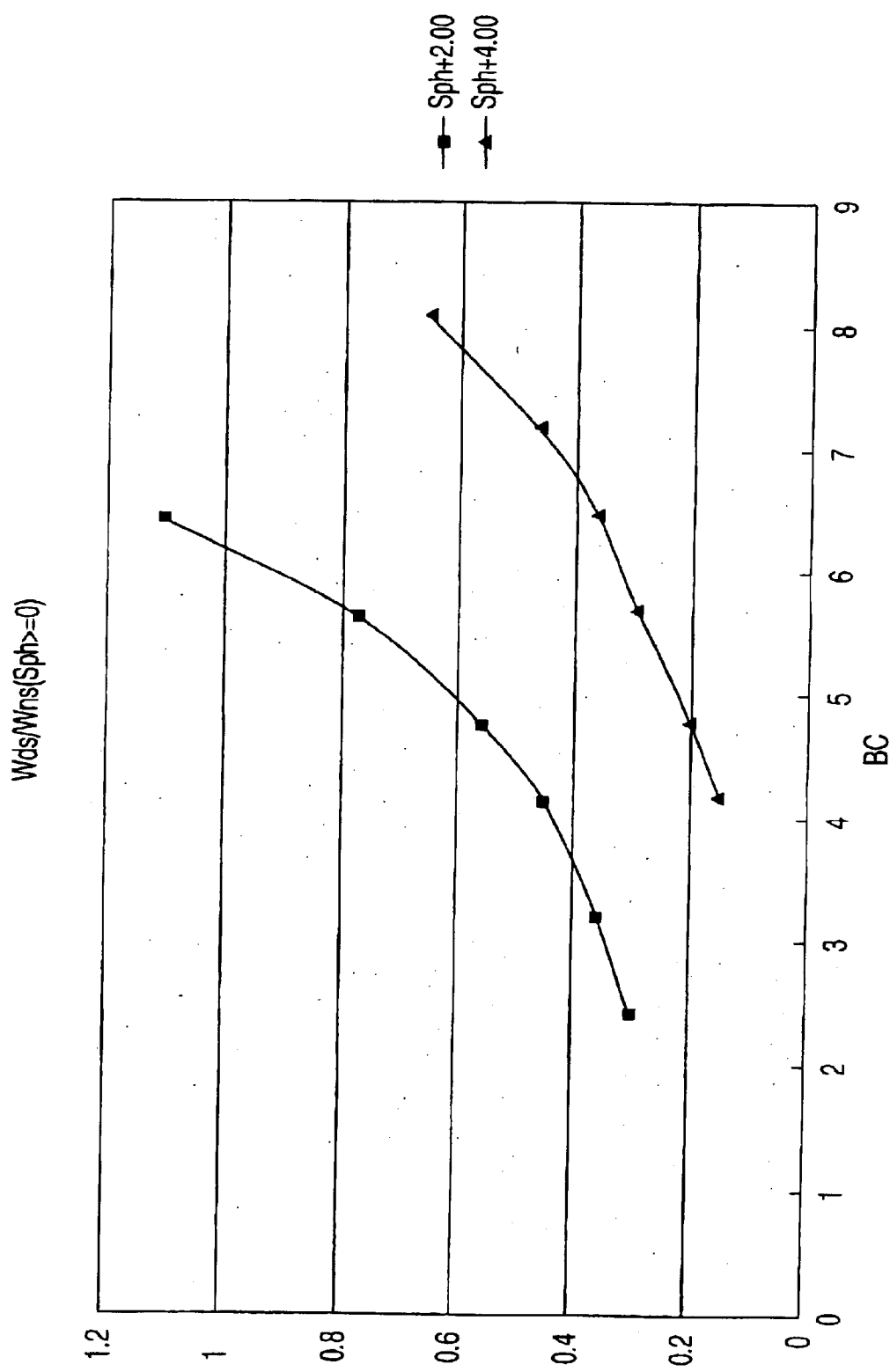
FIG. 7 is a graph illustrating variation of Wds/Wns with respect to variation of the base curve when the spherical refractive power for the distance portion Sph has a plus value.

FIG. 6 is a graph illustrating variation of (Wds/Wns)/(Wdt/Wnt) with respect to variation of the base curve when the spherical refractive power for the distance portion Sph has a plus value. FIG. 7 is a graph illustrating variation of Wds/Wns with respect to variation of the base curve when the spherical refractive power for the distance portion Sph has a plus value.

As can be seen from FIG. 5, even if the base curve varies, distribution of transmission astigmatism exhibits substantially the same distribution. Since all of the lenses shown in FIG. 5 (i.e., the series of lenses of the first embodiment) have substantially the same aberration distribution, the series of lenses has excellent optical performance.

As can be seen from FIG. 6, the series of lenses satisfy the condition (1). In addition, the series of lenses satisfy the condition (3).

As can be seen from FIG. 7, the series of lenses satisfy the condition (5) if the Sph is +4.00.

Figure 8:
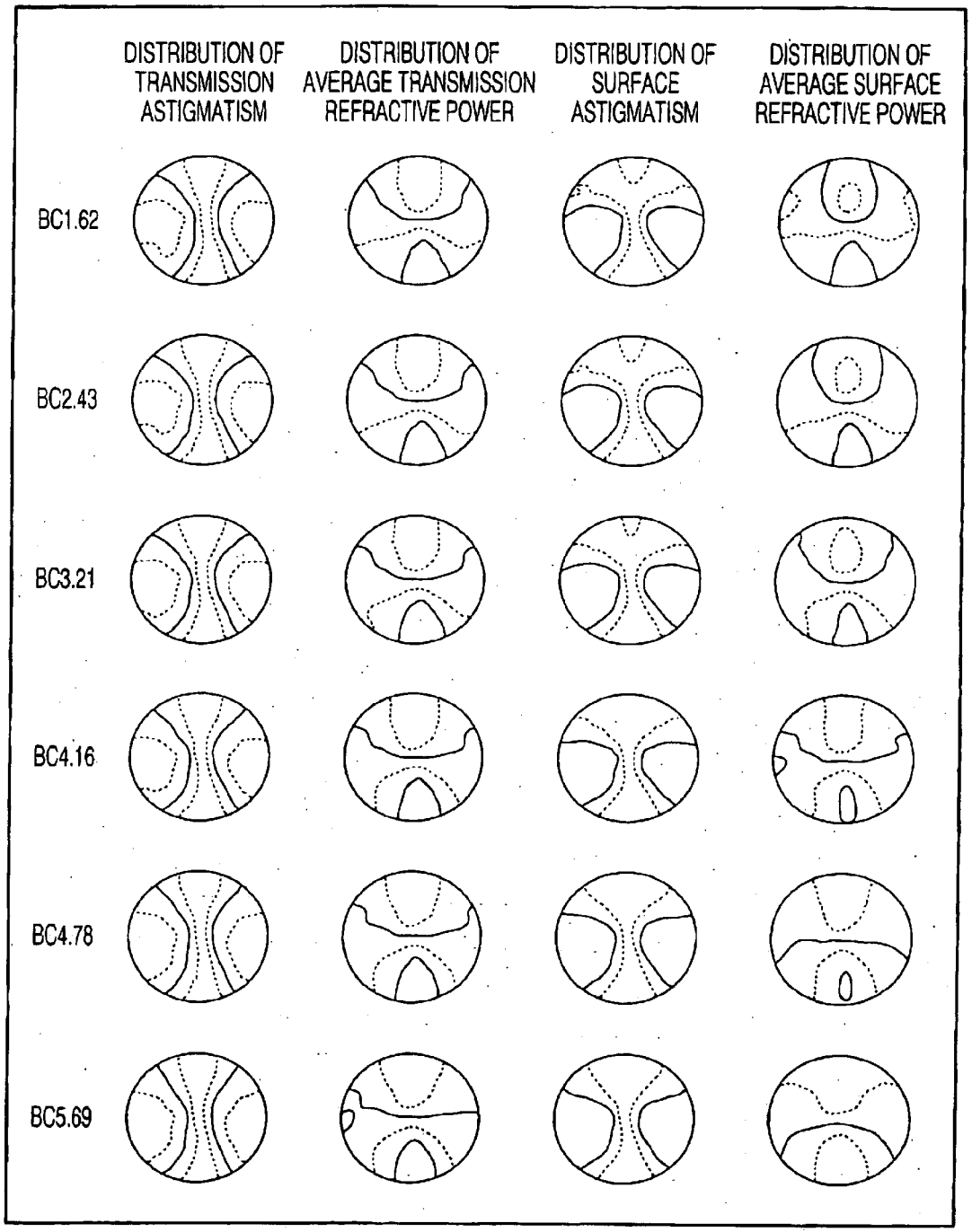
FIG. 8 shows transmission performance and surface performance of several lenses of the series of lenses according to the first embodiment.

FIG. 8 shows transmission performance and surface performance of several lenses of the series of lenses according to the first embodiment. More specifically, in FIG. 8, distribution of transmission astigmatism, distribution of average transmission refractive power, distribution of surface astigmatism and distribution of average surface refractive power are indicated for each of the several lenses. Each of the lenses shown in FIG. 8 has a common spherical refractive power Sph of −2.00 [D], and additional dioptric power of 2.0 [D]. The base curves of the lenses listed in FIG. 8 vertically in order of increasing base curve are 1.62, 2.43, 3.21, 4.16, 4.78, and 5.69 [D], respectively.

Figure 9:
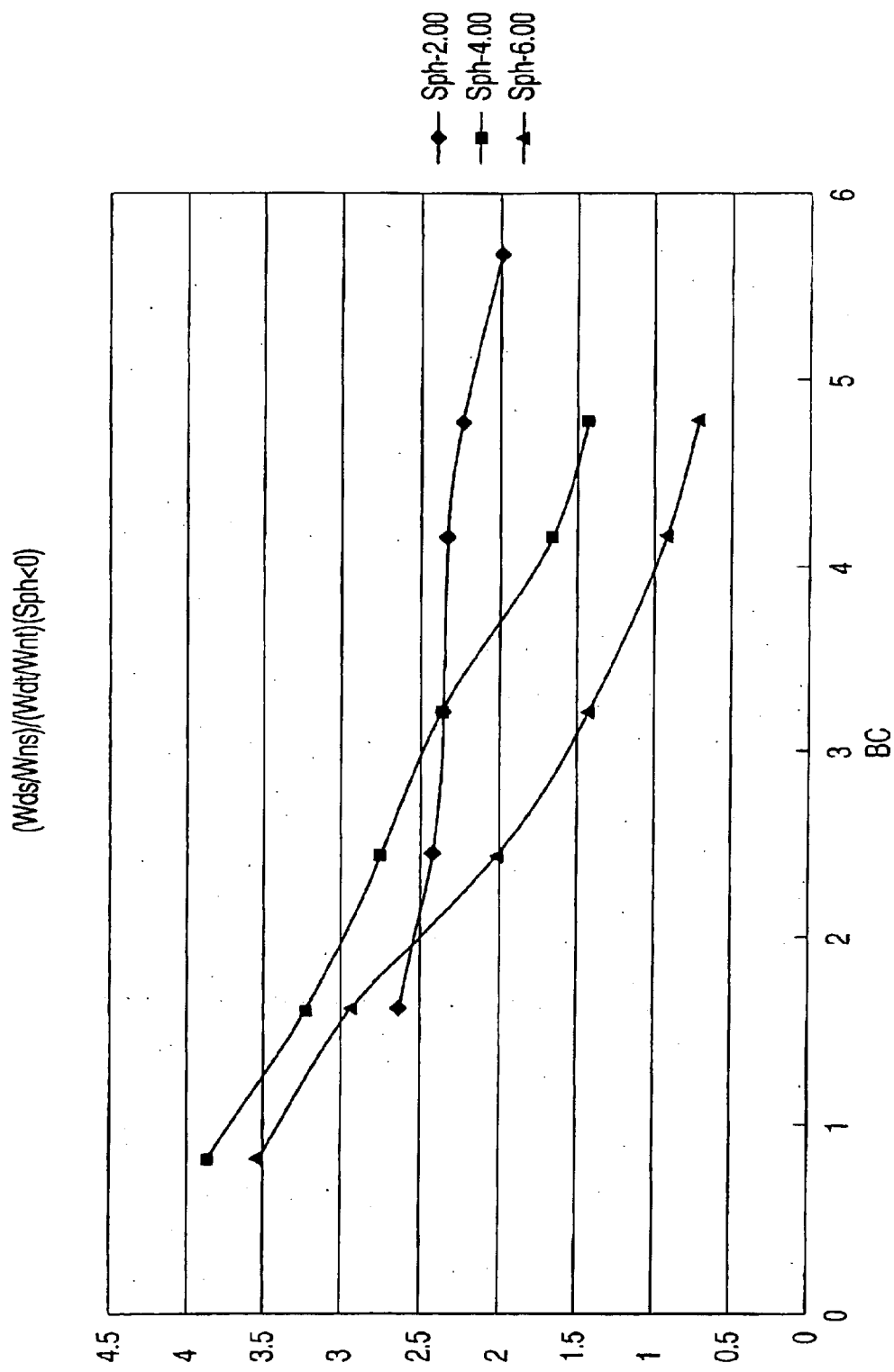
FIG. 9 is a graph illustrating variation of (Wds/Wns)/(Wdt/Wnt) with respect to variation of the base curve when the spherical refractive power for the distance portion Sph has a minus value.
Figure 10:
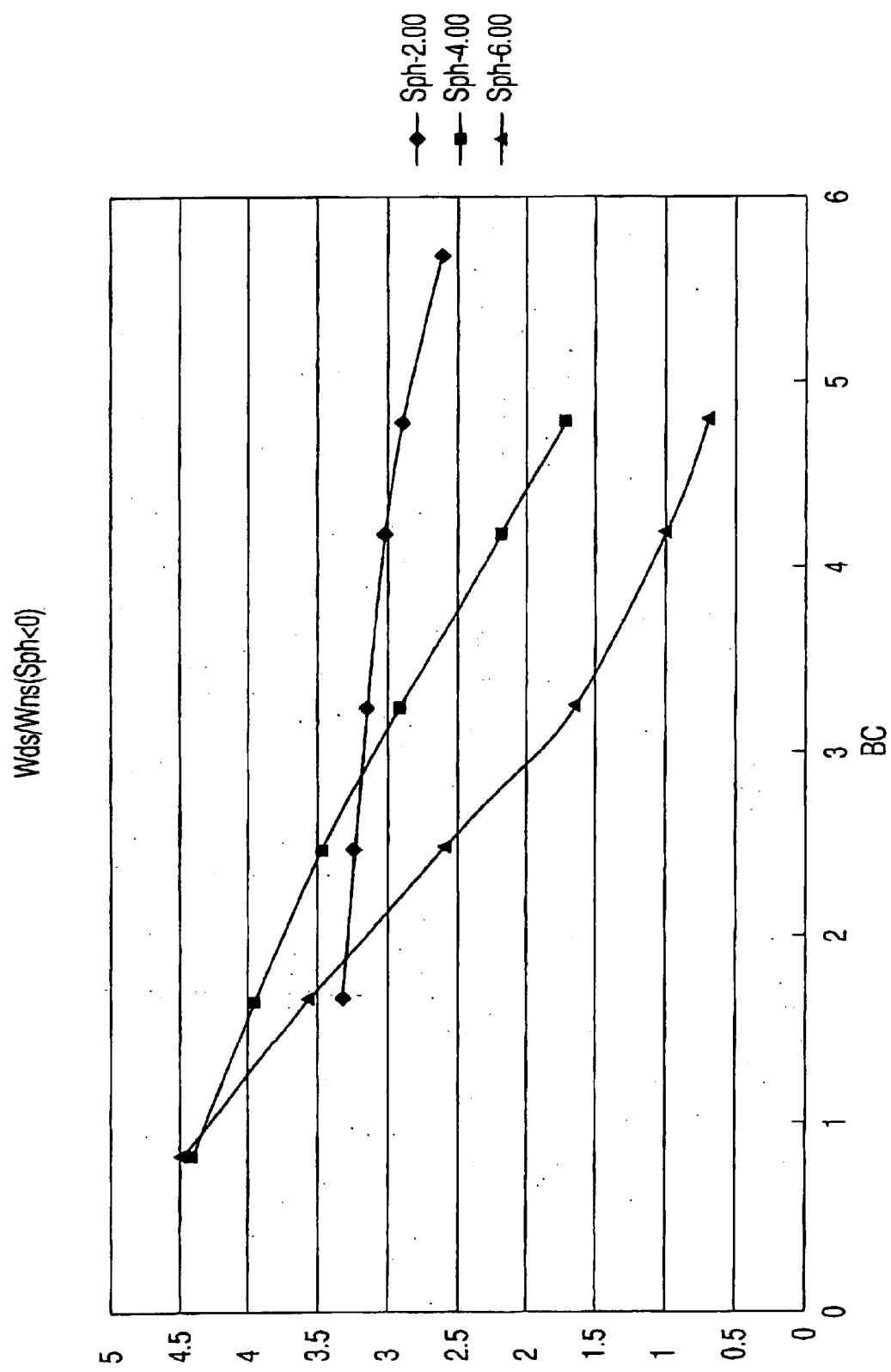
FIG. 10 is a graph illustrating variation of Wds/Wns with respect to variation of the base curve when the spherical refractive power for the distance portion Sph has a minus value.

FIG. 9 is a graph illustrating variation of (Wds/Wns)/(Wdt/Wnt) with respect to variation of the base curve when the spherical refractive power for the distance portion Sph has a minus value. FIG. 10 is a graph illustrating variation of Wds/Wns with respect to variation of the base curve when the spherical refractive power for the distance portion Sph has a minus value.

As can be seen from FIG. 8, even if the base curve varies, distribution of transmission astigmatism exhibits substantially the same distribution. Since all of the lenses shown in FIG. 8 (i.e., the series of lenses of the first embodiment) have substantially the same aberration distribution, the series of lenses has excellent optical performance.

As can be seen from FIG. 9, the series of lenses satisfy the condition (2). In addition, if the Sph is −2.00 or −4.00, the series of lenses satisfy the condition (4).

As can be seen from FIG. 10, the series of lenses satisfy the condition (6) if the Sph is −2.00 or −4.00.

Figure 11:
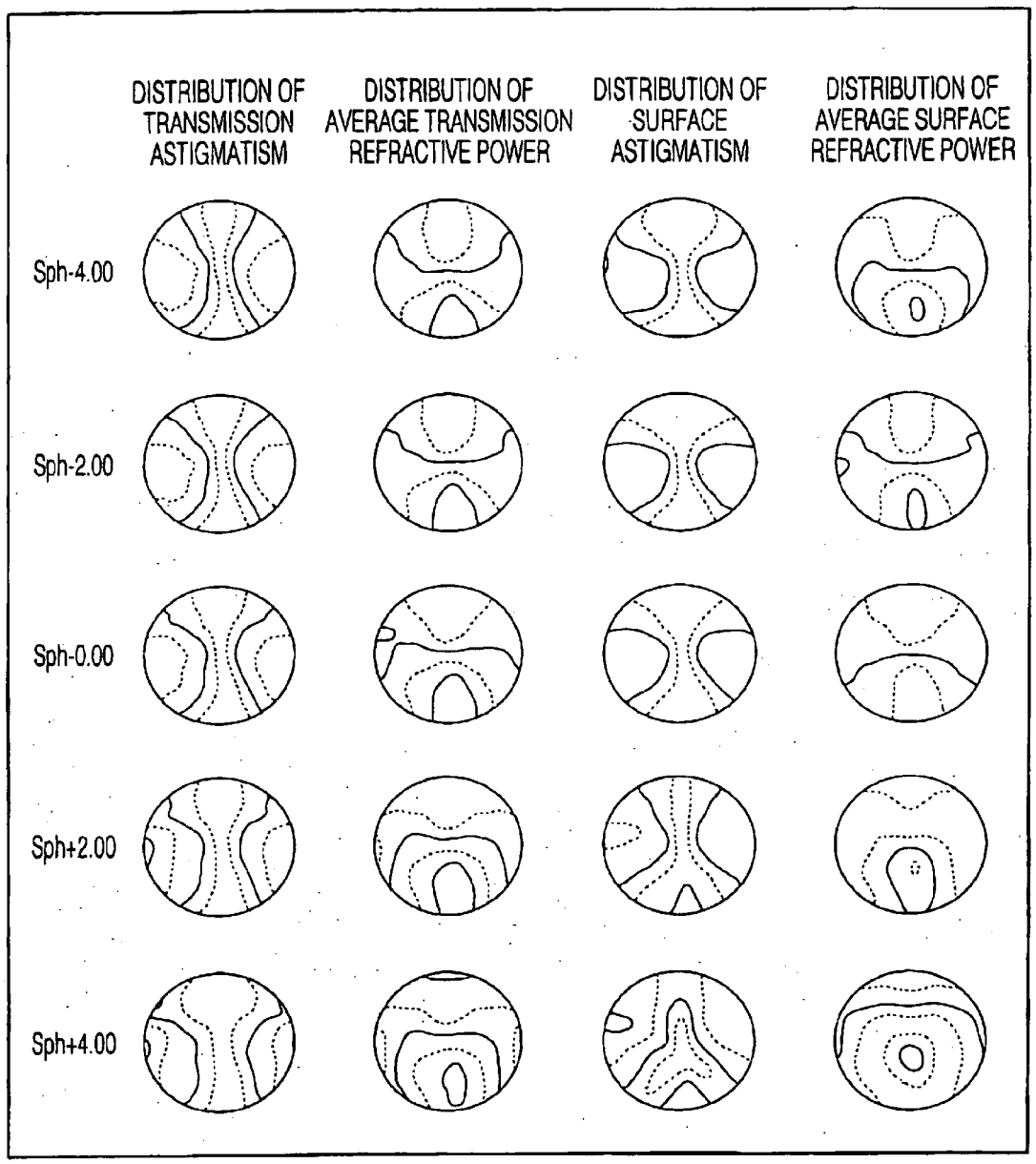
FIG. 11 shows transmission performance and surface performance of several lenses of the series of lenses according to the first embodiment.

FIG. 11 shows transmission performance and surface performance of several lenses of the series of lenses according to the first embodiment. More specifically, in FIG. 11, distribution of transmission astigmatism, distribution of average transmission refractive power, distribution of surface astigmatism and distribution of average surface refractive power are indicated for each of the several lenses. Each of the lenses shown in FIG. 11 has a common base curve of 4.16 [D], and additional dioptric power of 2.0 [D]. The spherical refractive power for the distance portion Sph of the lenses listed in FIG. 8 vertically in order of increasing power are −4.00, −2.00, 0.00, +2.00 and +4.00 [D], respectively.

Figure 12:
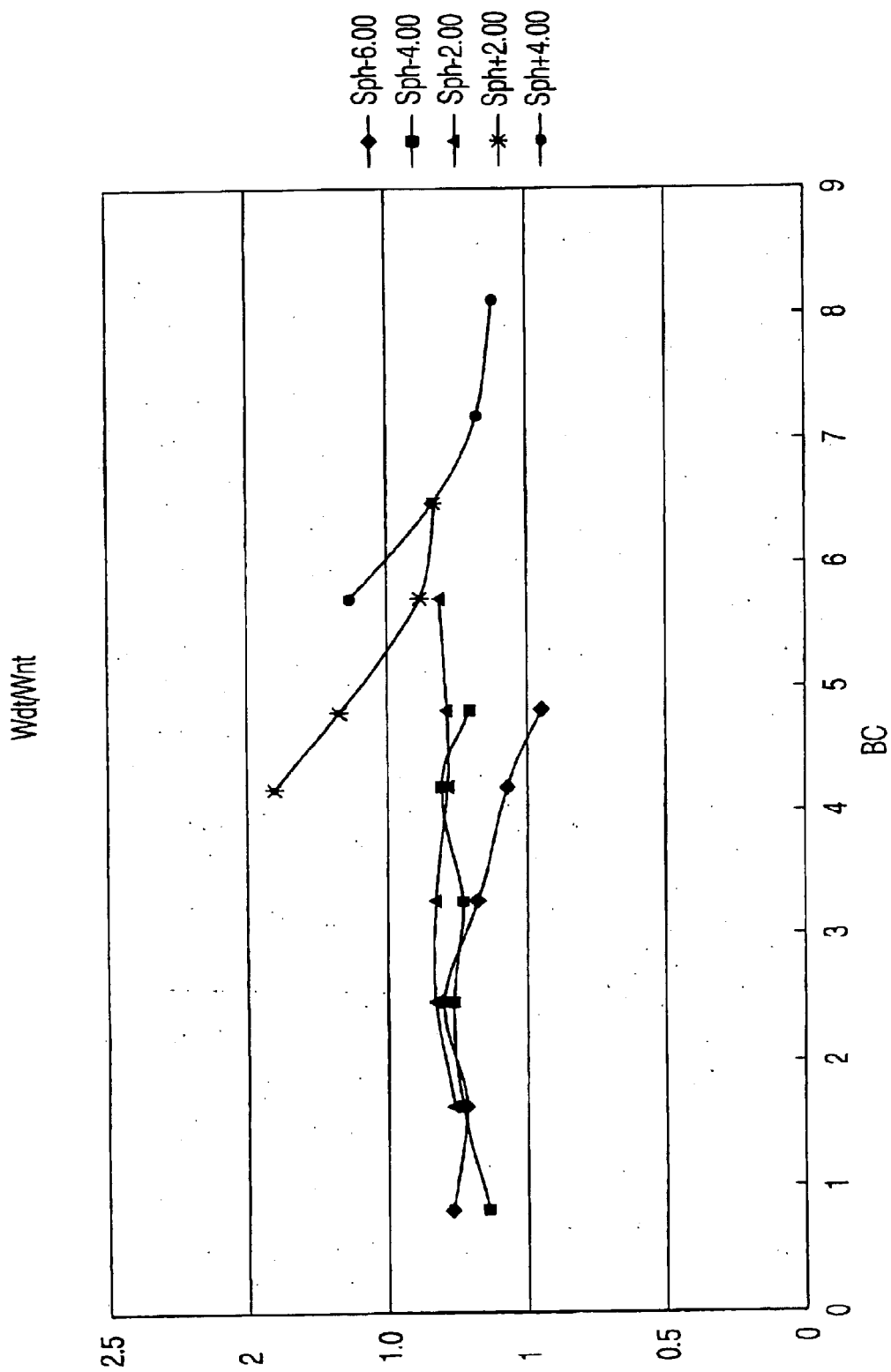
FIG. 12 is a graph illustrating variation of Wdt/Wnt with respect to variation of the base curve.

FIG. 12 is a graph illustrating variation of Wdt/Wnt with respect to variation of the base curve.

As can be seen from FIGS. 11 and 12, even if the spherical refractive power for the distance portion varies and even if the base curve varies, distribution of transmission astigmatism exhibits substantially the same distribution. Since all of the lenses shown in FIG. 11 (i.e., the series of lenses of the first embodiment) have substantially the same aberration distribution, the series of lenses has excellent optical performance.

As can be seen from FIG. 12, the series of lenses satisfy the conditions (7)–(11).

Second Embodiment

FIGS. 13A and 13B respectively show distribution of transmission astigmatism and distribution of average transmission refractive power of a progressive power lens 20 according to a second embodiment of the invention. In each of FIGS. 13A and 13B (and in each of the following distribution maps), an interval between adjacent contour lines corresponds to 0.5 (unit: D). The progressive power lens 20 has a diameter of 60 mm.

FIGS. 14A and 14B respectively show distribution of surface astigmatism and distribution of average surface refractive power of the progressive power lens 20.

The transmission performance shown in FIGS. 13A and 13B is a target optical performance of a series of progressive power lenses according to the second embodiment of the invention. The series of progressive power lenses is designed to attain the transmission performance shown in FIGS. 13A and 13B.

The progressive power lens 20, a so-called progressive power lens for short distance, has spherical refractive power Sph of 0.0 [D], additional dioptric power AD of 2.0 [D], and a base curve BC of 4.16 [D]. A progressive area of the lens 20 starts at a point shifted upward by 11 mm from a geometrical origin point, extends downward, and ends at a point shifted downward by 8 mm from the origin point. That is, the length of the progressive area (i.e., a middle portion) is 19 mm.

The progressive power lens 20 principally targeted for the near vision satisfies a condition (12).

$$0.2 < \frac{Wdt}{Wnt} < 1.0 \quad (12)$$

The progressive power lens whose widths of the clear vision areas in the distance portion and in the near portion satisfy the condition (12) is a progressive power lens for short distance having excellent transmission performance. The wearer who wears such a progressive power lens for short distance can obtain an excellent wearing comfort particularly in viewing objects at short distances.

Figure 15:
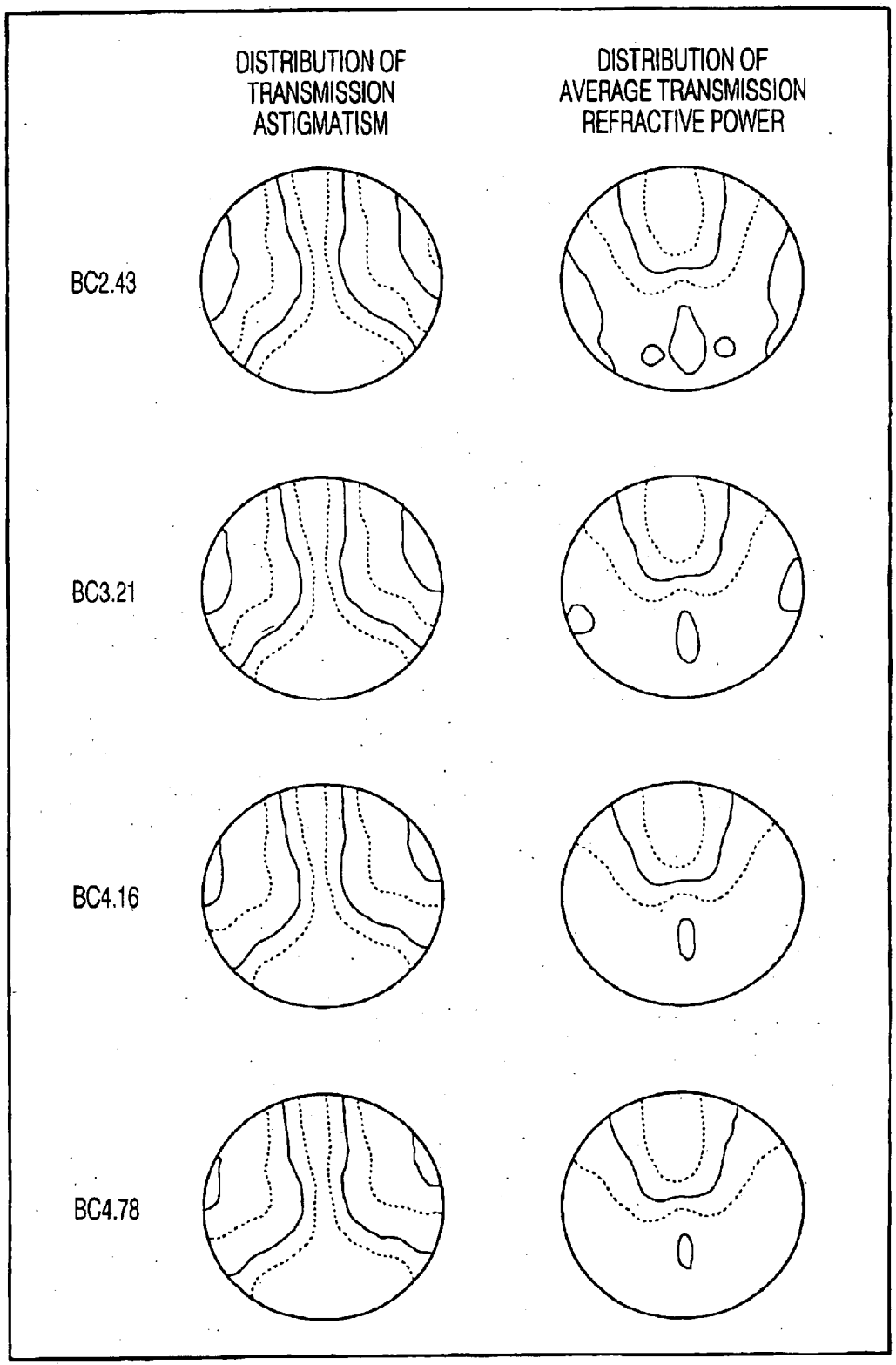
FIG. 15 shows transmission performance of several lenses of the series of lenses according to the second embodiment.

FIG. 15 shows transmission performance of several lenses of the series of lenses according to the second embodiment. More specifically, in FIG. 15, distribution of transmission astigmatism and distribution of average transmission refractive power are indicated for each of the several lenses. The progressive power lenses shown in FIG. 15 have a common spherical refractive power for the distance portion, and the base curves of the lenses are different from each other.

Each of the lenses shown in FIG. 15 has the spherical refractive power for the distance portion Sph of −2.0 [D], and additional dioptric power of 2.0 [D]. The base curves of the lenses listed in FIG. 15 vertically in order of increasing base curve are 2.43, 3.21, 4.16 and 4.78 [D], respectively. Each of the lenses shown in FIG. 15 has a progressive area starts at a point shifted upward by 11 mm from a geometrical origin point O, extends downward, and ends at a point shifted downward by 8 mm from the origin point.

Figure 16:
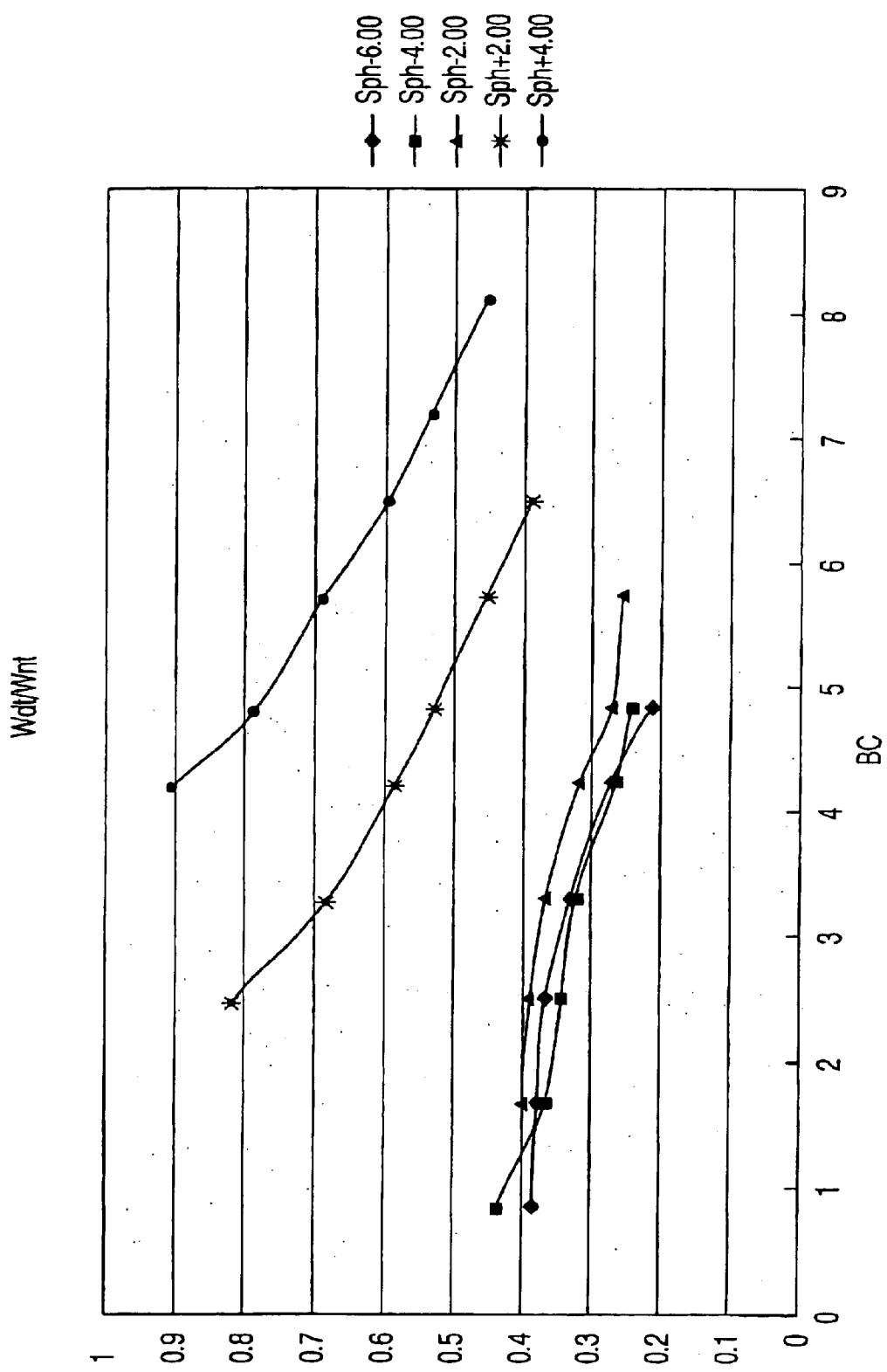
FIG. 16 is a graph illustrating variation of Wdt/Wnt with respect to variation of the base curve.

FIG. 16 is a graph illustrating variation of Wdt/Wnt with respect to variation of the base curve.

As can be seen from FIGS. 15 and 16, even if one of the spherical refractive power for the distance portion and the base curve varies or even if both of the spherical refractive power for the distance portion and the base curve vary, distribution of transmission astigmatism exhibits substantially the same distribution. Since all of the lenses shown in FIG. 15 (i.e., the series of lenses of the second embodiment) have substantially the same aberration distribution, the series of lenses has excellent optical performance.

As can be seen from FIG. 16, the series of progressive power lens according to the second embodiment satisfy the condition (12).

Comparative Example

Figure 17A:
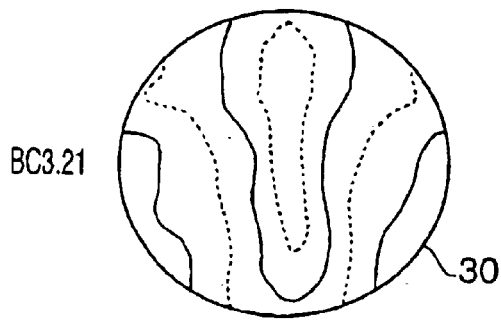
FIG. 17A shows distribution of transmission astigmatism of a progressive power lens which is a comparative example with respect to the progressive power lens of the first embodiment.
Figure 17B:
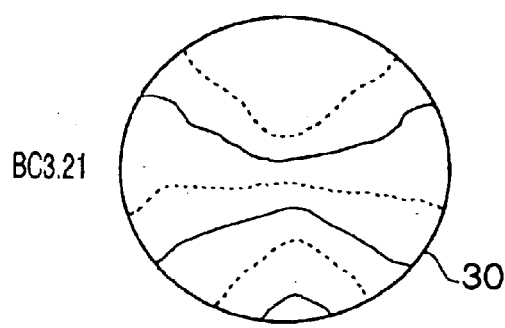
FIG. 17B shows distribution of average transmission refractive power of the progressive power lens according to the comparative example.
Figure 18A:
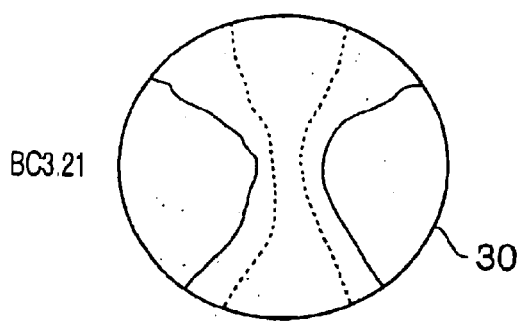
FIG. 18A shows distribution of surface astigmatism of the progressive power lens according to the comparative example.
Figure 18B:
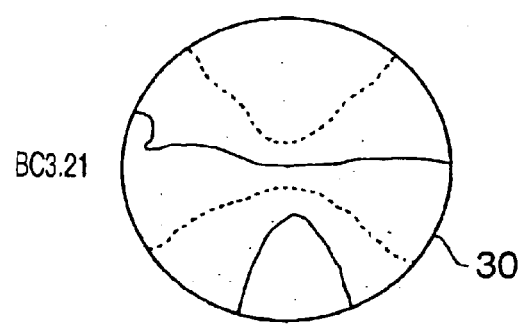
FIG. 18B shows distribution of average surface refractive power of the progressive power lens according to the comparative example.

FIGS. 17A and 17B respectively show distribution of transmission astigmatism and distribution of average transmission refractive power of a progressive power lens 30 which is a comparative example with respect to the progressive power lens 10. FIGS. 18A and 18B respectively show distribution of surface astigmatism and distribution of average surface refractive power of the progressive power lens 30.

Similarly to the progressive power lens 10, the progressive power lens 30 has spherical refractive power Sph of 0.0 [D], additional dioptric power AD of 2.0 [D], and a base curve BC of 3.21 [D]. A progressive area of the lens 30 starts at a point shifted upward by 11 mm from a geometrical origin point O, extends downward, and ends at a point shifted downward by 8 mm from the origin point.

The astigmatism of the comparative example is optimized according to evaluation of the surface optical performance and is not optimized according to evaluation of the transmission optical performance. As can be seen by comparison between FIG. 17 and FIG. 18, transmission performance and surface performance are different from each other considerably. For this reason, widths of the clear vision areas in the distance portion and in the near portion are relatively narrow, and therefore wide filed of view can not be attained.

On the contrary, the progressive power lens 10 has wide clear vision areas both in the distance portion and the near portion, and therefore accomplishes high optical performance.

Although the present invention has been described in considerable detail with reference to certain preferred embodiments thereof, other embodiments are possible.

In order to attain a progressive power lens having both of an excellent aesthetic appearance and high optical performance, it is required that transmission astigmatism is optimized and distribution of transmission astigmatism hardly changes even if the base curve and/or the spherical dioptric power changes. In this regard, according to the embodiments of the invention, both of the excellent aesthetic appearance and high optical performance are attained by controlling the widths of clear vision areas in regard to the surface astigmatism and the transmission astigmatism in accordance with to the above mentioned conditions.

As described above, according to the embodiments of the invention, progressive power lenses having a unified aberration balance which is not affected even if the base curve and the spherical refractive power for the distance portion are changed to keep the clear vision area (i.e., an actual vision of the wearer) wide and to keep the aesthetic appearance excellent.

The present disclosure relates to the subject matter contained in Japanese Patent Application No. P2002-303134, filed on Oct. 17, 2002, which is expressly incorporated herein by reference in its entirety.

What is claimed is:

1. A progressive power lens belonging to a series of progressive power lenses which is designed such that lenses belonging to said series of progressive power lenses have substantially the same basic specification and said lenses belonging to said series of progressive power lenses have different base curves, said progressive power lens having a front surface and a rear surface, at least one of said front and rear surfaces including: a distance portion having refractive power for distance vision; a near portion having refractive power for near vision; and a middle portion in which refractive power continuously changes to connect the refractive power of the distance portion and the refractive power of the near portion, wherein if a first lens- and a second lens randomly chosen from said series of progressive power lenses have a common spherical refractive power Sph [diopter] at distance reference points thereof, the Sph is greater than or equal to +1, and a base curve $BC_1$ of the first lens is smaller than a base curve $BC_2$ of the second lens, said first and second lenses satisfy a condition:

$$\frac{\frac{Wds(BC_1, Sph)}{Wns(BC_1, Sph)}}{\frac{Wdt(BC_1, Sph)}{Wnt(BC_1, Sph)}} < \frac{\frac{Wds(BC_2, Sph)}{Wns(BC_2, Sph)}}{\frac{Wdt(BC_2, Sph)}{Wnt(BC_2, Sph)}} \quad (1)$$

where Wdt represents a width of an area in which transmission astigmatism is less than or equal to one-half of additional dioptric power AD [diopter] which is defined as a difference of the refractive power at a distance reference point and the refractive power at a near reference point, Wdt being measured in a horizontal direction at a point in the distance portion shifted upward in a vertical direction by a certain distance from a geometrical origin of said progressive power lens, Wnt represents a width of an area in which transmission astigmatism is less than or equal to one-half of the AD, Wnt being measured in the horizontal direction at a point in the near portion shifted downward in the vertical direction by a certain distance from the geometrical origin, Wds represents a width of an area in which surface astigmatism is less than or equal to one-half of the AD, Wds being measured in the horizontal direction at a point in the distance portion shifted upward in the vertical direction by a certain distance from the geometrical origin, Wns represents a width of an area in which surface astigmatism is less than or equal to one-half of the AD, Wns being measured in the horizontal direction at a point in the near portion shifted downward in the vertical direction by a certain distance from the geometrical origin.

2. The progressive power lens according to claim 1, wherein said first and second lenses further satisfy a condition:

$$\frac{\frac{Wds(BC_1, Sph)}{Wns(BC_1, Sph)}}{\frac{Wdt(BC_1, Sph)}{Wnt(BC_1, Sph)}} < \frac{\frac{Wds(BC_2, Sph)}{Wns(BC_2, Sph)}}{\frac{Wdt(BC_2, Sph)}{Wnt(BC_2, Sph)}} < 1. \quad (3)$$

3. The progressive power lens according to claim 1, wherein a length of the middle portion in a vertical direction is greater than or equal to 15 mm and less than or equal to 30 mm.

4. The progressive power lens according to claim 1, wherein the distance portion, the near portion and the middle portion are formed on said rear surface.

5. The progressive power lens according to claim 1, wherein each of the points at which Wdt and Wds are measured substantially coincides with the distance reference point,
wherein each of the points at which Wnt and Wns are measured substantially coincides with the near reference point.

6. The progressive power lens according to claim 1, wherein each of the certain distances at which Wdt, Wnt, Wds and Wns are measured is 15 mm.

7. A progressive power lens belonging to a series of progressive power lenses which is designed such that lenses belonging to said series of progressive power lenses have substantially the same basic specification and said lenses belonging to said series of progressive power lenses have different base curves, said progressive power lens having a front surface and a rear surface,
at least one of said front and rear surfaces including: a distance portion having refractive power for distance vision; a near portion having refractive power for near vision; and a middle portion in which refractive power continuously changes to connect the refractive power of the distance portion and the refractive power of the near portion,
wherein if a first lens and a second lens randomly chosen from said series of progressive power lenses have a common spherical refractive power Sph [diopter] at distance reference points thereof, the Sph is smaller than or equal to −1, and a base curve $BC_1$ of the first lens is smaller than a base curve $BC_2$ of the second lens, said first and second lenses satisfy a condition:

$$\frac{\frac{Wds(BC_1, Sph)}{Wns(BC_1, Sph)}}{\frac{Wdt(BC_1, Sph)}{Wnt(BC_1, Sph)}} > \frac{\frac{Wds(BC_2, Sph)}{Wns(BC_2, Sph)}}{\frac{Wdt(BC_2, Sph)}{Wnt(BC_2, Sph)}} \quad (2)$$

where Wdt represents a width of an area in which transmission astigmatism is less than or equal to one-half of additional dioptric power AD [diopter] which is defined as a difference of the refractive power at a distance reference point and the refractive power at a near reference point, Wdt being measured in a horizontal direction at a point in the distance portion shifted upward in a vertical direction by a certain distance from a geometrical origin of said progressive power lens, Wnt represents a width of an area in which transmission astigmatism is less than or equal to one-half of the AD, Wnt being measured in the horizontal direction at a point in the near portion shifted downward in the vertical direction by a certain distance from the geometrical origin, Wds represents a width of an area in which surface astigmatism is less than or equal to one-half of the AD, Wds being measured in the horizontal direction at a point in the distance portion shifted upward in the vertical direction by a certain distance from the geometrical origin, Wns represents a width of an area in which surface astigmatism is less than or equal to one-half of the AD, Wns being measured in the horizontal direction at a point in the near portion shifted downward in the vertical direction by a certain distance from the geometrical origin.

8. The progressive power lens according to claim 7, wherein said first and second lenses further satisfy a condition:

$$\frac{\frac{Wds(BC_1, Sph)}{Wns(BC_1, Sph)}}{\frac{Wdt(BC_1, Sph)}{Wnt(BC_1, Sph)}} > \frac{\frac{Wds(BC_2, Sph)}{Wns(BC_2, Sph)}}{\frac{Wdt(BC_2, Sph)}{Wnt(BC_2, Sph)}} > 1. \quad (4)$$

9. A progressive power lens belonging to a series of progressive power lenses which is designed such that lenses belonging to said series of progressive power lenses have substantially the same basic specification and said lenses belonging to said series of progressive power lenses have different base curves, said progressive power lens having a front surface and a rear surface,
at least one of said front and rear surfaces including: a distance portion having refractive power for distance vision; a near portion having refractive power for near vision; and a middle portion in which refractive power continuously changes to connect the refractive power of the distance portion and the refractive power of the near portion,
wherein if a first lens and a second lens randomly chosen from said series of progressive power lenses have a common spherical refractive power Sph [diopter] at distance reference points thereof, the Sph is greater than or equal to +1, and a base curve $BC_1$ of the first lens is smaller than a base curve $BC_2$ of the second lens, said first and second lenses satisfy a condition:

$$\frac{Wds(BC_1, Sph)}{Wns(BC_1, Sph)} < \frac{Wds(BC_2, Sph)}{Wns(BC_2, Sph)} < 1 \qquad (5)$$

where Wds represents a width of an area in which surface astigmatism is less than or equal to one-half of additional dioptric power AD [diopter] which is defined as a difference of the refractive power at a distance reference pont and the refractive power at a near reference point, Wds being measured in the horizontal direction at a point in the distance portion shifted upward in the vertical direction by a certain distance from the geometrical origin, and Wns represents a width of an area in which surface astigmatism is less than or equal to one-half of the AD, Wns being measured in the horizontal direction at a point in the near portion shifted downward in the vertical direction by a certain distance from the geometrical origin.

10. A progressive power lens belonging to a series of progressive power lenses which is designed such that lenses belonging to said series of progressive power lenses have substantially the same basic specification and said lenses belonging to said series of progressive power lenses have different base curves, said progressive power lens having a front surface and a rear surface, at least one of said front and rear surfaces including: a distance portion having refractive power for distance vision; a near portion having refractive power for near vision; and a middle portion in which refractive power continuously changes to connect the refractive power of the distance portion and the refractive power of the near portion, wherein if a first lens and a second lens randomly chosen from said series of progressive power lenses have a common spherical refractive power Sph [diopter] at distance reference points, the Sph is smaller than or equal to −1, and a base curve $BC_1$ of the first lens is smaller than a base curve $BC_2$ of the second lens, said first and second lenses satisfy a condition:

$$\frac{Wds(BC_1, Sph)}{Wns(BC_1, Sph)} > \frac{Wds(BC_2, Sph)}{Wns(BC_2, Sph)} > 1 \qquad (6)$$

where Wds represents a width of an area in which surface astigmatism is less than or equal to one-half of additional dioptric power AD [diopter] which is defined as a difference of the refractive power at a distance reference point and the refractive power at a near reference point, Wds being measured in the horizontal direction at a point in the distance portion shifted upward in the vertical direction by a certain distance from the geometrical origin, and Wns represents a width of an area in which surface astigmatism is less than or equal to one-half of the AD, Wns being measured in the horizontal direction at a point in the near portion shifted downward in the vertical direction by a certain distance from the geometrical origin.

11. A progressive power lens belonging to a series of progressive power lenses which is designed such that lenses belonging to said series of progressive power lenses have substantially the same basic specification and said lenses belonging to said series of progressive power lenses have different base curves, said progressive power lens having a front surface and a rear surface, at least one of said front and rear surfaces including: a distance portion having refractive power for distance vision; a near portion having refractive power for near vision; and a middle portion in which refractive power continuously changes to connect the refractive power of the distance portion and the refractive power of the near portion, wherein a first lens and a second lens randomly chosen from said series of progressive power lenses satisfy a condition if $BC_1 \neq BC_2$ or $Sph_1 \neq Sph_2$:

$$\left| \frac{Wdt(BC_1, Sph_1)}{Wnt(BC_1, Sph_1)} - \frac{Wdt(BC_2, Sph_2)}{Wnt(BC_2, Sph_2)} \right| \leq 1 \qquad (7)$$

where Wdt represents a width of an area in which transmission astigmatism is less than or equal to one-half of additional dioptric power AD [diopter] which is defined as a difference of the refractive power at a distance reference point and the refractive power at a near reference point, Wdt being measured in a horizontal direction at a point in the distance portion shifted upward in the vertical direction by a certain distance from a geometrical origin of said progressive power lens, Wnt represents a width of an area in which transmission astigmatism is less than or equal to one-half of the AD, Wnt being measured in the horizontal direction at a point in the near portion shifted downward in the vertical direction by a certain distance from the geometrical origin, $BC_1$ and $BC_2$ respectively represent base curves of the first and second lenses, $Sph_1$ and $Sph_2$ respectively represent spherical refractive power of the first and the second lenses at distance reference points thereof.

12. The progressive power lens according to claim 11, wherein the first and second lenses further satisfy a condition:

$$\left| \frac{Wdt(BC_1, Sph_f)}{Wnt(BC_1, Sph_f)} - \frac{Wdt(BC_2, Sph_f)}{Wnt(BC_2, Sph_f)} \right| \leq 1 \qquad (8)$$

where $BC_1 \neq BC_2$, and both of $Sph_1$ and $Sph_2$ take a certain value $Sph_f$ ($Sph_1 = Sph_2 = Sph_f$).

13. The progressive power lens according to claim 12, wherein if the $Sph_f$ is less than 0, the first and second lenses further satisfy a condition:

$$\left| \frac{Wdt(BC_1, Sph_f)}{Wnt(BC_1, Sph_f)} - \frac{Wdt(BC_2, Sph_f)}{Wnt(BC_2, Sph_f)} \right| \leq 0.5. \qquad (9)$$

14. The progressive power lens according to claim 11, wherein if both of $BC_1$ and $BC_2$ take a certain value $BC_f$ ($BC_1 = BC_2 = BC_f$) and $Sph_1 \neq Sph_2$, the first and second lenses further satisfy a condition:

$$\left| \frac{Wdt(BC_f, Sph_1)}{Wnt(BC_f, Sph_1)} - \frac{Wdt(BC_f, Sph_2)}{Wnt(BC_f, Sph_2)} \right| \leq 1. \qquad (10)$$

15. A progressive power lens for middle/short distances having a front surface and a rear surface, at least one of said front and rear surfaces including a distance portion having refractive power for distance vision, a near portion having refractive power for near vision, and a middle portion in which refractive power continuously changes to connect the refractive power of the distance portion and the refractive power of the near portion, said progressive power lens satisfying a condition:

$$0.8 < \frac{Wdt}{Wnt} < 2.0 \qquad (11)$$

where Wdt represents a width of an area in which transmission astigmatism is less than or equal to one-half of additional dioptric power AD [diopter] which is defined as a difference of the refractive power at a distance reference point and the refractive power at a near distance point, Wdt being measured in a horizontal direction at a point in the distance portion shifted upward in the vertical direction by a certain distance from a geometrical origin of said progressive power lens, and Wnt represents a width of an area in which transmission astigmatism is less than or equal to one-half of the AD, Wnt being measured in the horizontal direction at a point in the near portion shifted downward in the vertical direction by a certain distance from the geometrical origin.

16. The progressive power lens according to claim 15, wherein a length of the middle portion in a vertical direction is greater than or equal to 15 mm and less than or equal to 30 mm.

17. The progressive power lens according to claim 15, wherein the distance portion, the near portion and the middle portion are formed on said rear surface.

18. The progressive power lens according to claim 15, wherein each of the certain distances at which Wdt and Wnt are measured is 15 mm.

19. A progressive power lens for short distance having a front surface and a rear surface, at least one of said front and rear surfaces including a distance portion having refractive power for distance vision, a near portion having refractive power for near vision, and a middle portion in which refractive power continuously changes to connect the refractive power of the distance portion and the refractive power of the near portion, said progressive power lens satisfying a condition:

$$0.2 < \frac{Wdt}{Wnt} < 1.0 \qquad (12)$$

where Wdt represents a width of an area in which transmission astigmatism is less than or equal to one-half of additional dioptric power AD [diopter] which is defined as a difference of the refractive power at a distance reference point and the refractive power at a near reference point, Wdt being measured in a horizontal direction at a point in the distance portion shifted upward in the vertical direction by a certain distance from a geometrical origin of said progressive power lens, and Wnt represents a width of an area in which transmission astigmatism is less than or equal to one-half of the AD, Wnt being measured in the horizontal direction at a point in the near portion shifted downward in the vertical direction by a certain distance from the geometrical origin.

* * * * *